United States Patent
Kumazaki et al.

(10) Patent No.: US 7,980,991 B2
(45) Date of Patent: Jul. 19, 2011

(54) CONTROL DEVICE FOR HYBRID VEHICLE DRIVE APPARATUS

(75) Inventors: Kenta Kumazaki, Toyota (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 653 days.

(21) Appl. No.: 12/078,862

(22) Filed: Apr. 7, 2008

(65) Prior Publication Data

US 2008/0255748 A1 Oct. 16, 2008

(30) Foreign Application Priority Data

Apr. 13, 2007 (JP) ................... 2007-106469

(51) Int. Cl.
*B60W 10/12* (2006.01)
(52) U.S. Cl. .............. 477/15; 477/5; 477/6; 477/20
(58) Field of Classification Search .............. 477/2, 5, 477/6, 15, 20
See application file for complete search history.

(56) References Cited

U.S. PATENT DOCUMENTS

| | | | |
|---|---|---|---|
| 7,803,086 B2 * | 9/2010 | Tabata et al. ............... | 477/3 |
| 2008/0293539 A1 * | 11/2008 | Matsubara et al. .......... | 477/37 |
| 2009/0011895 A1 * | 1/2009 | Tabata et al. ............... | 477/3 |
| 2009/0023547 A1 * | 1/2009 | Matsubara et al. .......... | 477/3 |
| 2009/0029819 A1 * | 1/2009 | Tabata et al. ............... | 475/5 |

FOREIGN PATENT DOCUMENTS

| | | |
|---|---|---|
| JP | A-2004-266958 | 9/2004 |
| JP | A-2005-172044 | 6/2005 |
| JP | A-2006-002913 | 1/2006 |
| JP | A-2006-298067 | 11/2006 |

OTHER PUBLICATIONS

Japanese Office Action issued on Dec. 1, 2009 in Japanese Patent Application No. 2007-106469 (with translation).

* cited by examiner

*Primary Examiner* — Ha D. Ho
(74) *Attorney, Agent, or Firm* — Oliff & Berridge, PLC

(57) ABSTRACT

When the power transmitting path in an automatic shifting portion (20) is interrupted, a Co-lock control is executed to allow a differential portion (11) to be placed in a non-differential or nearly non-differential state with rotary elements (RE1 to RE3) kept in a unitary rotation. Thus, an engine (8), a first electric motor (M1) and a second electric motor (M2) rotate at an identical or nearly identical speed. Then, for the purpose of controlling the second electric motor (M2) at a rotation speed below a permit rotation speed, it may suffice for the first and second electric motors (M1) and (M2) to be driven in a direction to lower relevant rotation speeds while monitoring any one of an engine rotation speed, a first-motor rotation speed and a second-motor rotation speed. This allows such a control to be easily executed, thereby preventing the second electric motor from reaching a high speed rotation.

18 Claims, 11 Drawing Sheets

|  | C0 | C1 | C2 | B0 | B1 | B2 | B3 | SHIFTING RATIO | STEP |
|---|---|---|---|---|---|---|---|---|---|
| 1st | ◎ | ○ |  |  |  |  | ○ | 3.357 | 1.54 |
| 2nd | ◎ | ○ |  |  |  | ○ |  | 2.180 | 1.53 |
| 3rd | ◎ | ○ |  |  | ○ |  |  | 1.424 | 1.42 |
| 4th | ◎ | ○ | ○ |  |  |  |  | 1.000 | 1.42 |
| 5th |  | ○ | ○ | ◎ |  |  |  | 0.705 | TOTAL 4.76 |
| R |  |  | ○ |  |  |  | ○ | 3.209 | |
| N |  |  |  |  |  |  |  |  | |

○ ENGAGED
◎ ENGAGED UPON STEP-VARIABLE
  RELEASED UPON CONTINUOUSLY-VARIABLE

CONTROL DEVICE FOR HYBRID VEHICLE DRIVE APPARATUS

BACKGROUND OF THE INVENTION

1. Technical Field

The present invention relates to control devices for vehicle drive apparatuses, and more particularly, to a technology of appropriately limiting a rotation speed of an electric motor in a hybrid vehicle drive apparatus having a differential mechanism operative to perform a differential action.

2. Background Art

An attempt has heretofore been made to provide a four-wheel drive vehicle in which front wheels and an electric power generator are driven with an engine and rear wheels are driven with an electric motor directly via a clutch engaging device upon receipt of electric power supplied from the electric power generator. There has heretofore been known a drive control device for such a four-wheel drive vehicle in which when disengaging the clutch engaging device to switch a four-wheel drive state to a front-wheel drive state, both operations are executed to disengage the clutch engaging element and interrupting the supply of electric power to the electric motor while executing a control to cut off a field current of such an electric motor. For instance, Patent Publication 1 (Japanese Patent Application Publication No. 2004-266958A) discloses a drive control device representing the drive control device set forth above. There has heretofore been also known a drive control device disclosed in Patent Publication 2 (Japanese Patent Application Publication No. 2005-172044A).

A hybrid vehicle drive apparatus, to which the present invention is related, includes an electrically controlled differential portion having a differential mechanism including a first rotary element connected to an engine in a drive-force transmissive state, a second rotary element connected to a first electric motor in a drive-force transmissive state, and a third rotary element connected to a power transmitting path leading to drive wheels, a second electric motor connected to the power transmitting path, and an automatic shifting portion forming a part of the power transmitting path to function as an automatic power transmission. With such a hybrid vehicle drive apparatus, if a vehicle occupant operates, for instance, a shift lever to cause a disconnection in the power transmitting path from the second electric motor to the drive wheels, the differential mechanism performs a differential action and, hence, it becomes complicated to control a rotation speed of the second electric motor. This results in a probability with the second electric motor rotating at a high speed exceeding a permit rotation speed. With the second electric motor rotating at such a high speed, there is the possibility of causing degradation in durability of the second electric motor.

To address such an issue, even if the invention disclosed in Patent Publication 1 is applied so as to interrupt the supply of electric power to the second electric motor in synchronism with the disconnecting operation of the power transmitting path, the rotation speed of the second electric motor remains unchanged under the complicated control. This is because the rotation speed of the second electric motor depends on a rotation speed of the engine and a rotation speed of the first electric motor due to the differential action mentioned above. Thus, under a circumstance where the second electric motor is applied with high torque from the engine and rotates at a speed in the vicinity of the permit rotation speed, difficulty has been encountered in preventing the second electric motor from rotating at a high speed.

SUMMARY OF THE INVENTION

The present invention has been completed with such a view in mind and has an object to provide a control device for a hybrid vehicle drive apparatus, having a differential mechanism operative to perform a differential action and an electric motor, which can prevent the occurrence of high speed rotation of the electric motor.

For achieving the above object, in a first aspect of the present invention, a control device for a hybrid vehicle drive apparatus is featured by that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected such that power can be transmitted between drive wheels and the second electric motor, and a shifting portion or an engaging element forming a part of a power transmitting path; (b) the differential mechanism includes a differential action limiting device for limiting the differential action thereof; and (c) the control device is operative to cause the differential action limiting device to limit the differential action of the differential mechanism, when the shifting portion is placed in a neutral state with the power transmitting path being interrupted.

A second aspect of the present invention is featured by that the control device causes the differential action limiting device to limit the differential action of the differential mechanism, when a vehicle speed lies at a high vehicle speed exceeding a given vehicle speed determining value.

A third aspect of the present invention is featured by the given vehicle speed determining value is a function of a speed ratio of the shifting portion.

A fourth aspect of the present invention is featured by the control device causes the differential action limiting device to limit the differential action of the differential mechanism, when an output torque delivered from the engine lies at a high torque exceeding a given engine torque determining value.

A fifth aspect of the present invention is featured by that the control device causes the differential action limiting device to limit the differential action of the differential mechanism, when a rotation speed of the second electric motor lies at a high rotation speed exceeding a given second-motor rotation speed determining value.

A sixth aspect of the present invention is featured by that the control device causes the differential action limiting device to limit the differential action of the differential mechanism, when a rotation speed of an input shaft of the shifting portion lies at a high rotation speed exceeding a given input-shaft rotation speed determining value.

A seventh aspect of the present invention is featured by that the control device causes the differential action limiting device to limit the differential action of the differential mechanism, when a rotation speed of an engaging element incorporated in the shifting portion lies at a high rotation speed exceeding a given engaging-element rotation speed determining value.

A eighth aspect of the present invention is featured by that (a) the hybrid vehicle drive apparatus comprises an electrically controlled differential portion including a differential mechanism, connected to an engine in a drive-force transmissive state, whose differential state is controlled with controlling an operating state of a first electric motor, a second electric motor connected such that power can be transmitted between drive wheels and the second electric motor, and drive-force connecting/disconnecting means operative to connect and disconnect the power transmitting path; (b) the differential mechanism includes a differential action limiting device for limiting the differential action of the differential mechanism; and (c) the control device is operative to cause the differential action limiting device to limit the differential action of the differential mechanism, when the drive-force connecting/disconnecting means disconnects the power transmitting path.

A ninth aspect of the present invention is featured by the differential mechanism includes a first rotary element connected to the engine in a drive-force transmissive state, a second rotary element connected to the first electric motor in a drive-force transmissive state, and a third rotary element connected to the drive wheels in a drive-force transmissive state; and the differential action limiting device suppresses a relative rotation of at least two rotary elements among the first rotary element to third rotary element for limiting the differential action of the differential mechanism.

A tenth aspect of the present invention is featured by that the electrically controlled differential portion operates as a continuously variable transmission with controlling the operating state of the first electric motor.

With the invention in the first aspect, when the shifting portion lies in the neutral state, the differential action limiting device is rendered operative to limit the differential action of the differential mechanism. Therefore, the limitation of such a differential action causes the engine, to which the differential mechanism is connected to provide rotational resistance to the second electric motor to prevent the same from increasing in rotation speed, while easily controlling the second electric motor to rotate at a speed below the permit i.e. allowable rotation speed. This results in capability of preventing the second electric motor from reaching the high speed rotation.

The vehicle speed increases with an increase in rotation speed of the second electric motor connected to the drive wheels through the power transmitting path. In this respect, with the invention in the second aspect, if the vehicle speed reaches a high vehicle speed exceeding the given vehicle speed determining value, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric-motor from reaching the high speed rotation.

There is a probability wherein even if the vehicle speed is kept constant, the rotation speed of the second electric motor varies depending on a speed ratio of the shifting portion. With the invention in the third aspect, the vehicle speed determining value is a function of the speed ratio of the shifting portion. Therefore, no differential action of the differential mechanism is limited in a case where the second electric motor can be easily controlled at a speed below the permit rotation speed even in the absence of the limited differential action executed in the differential mechanism. Such a limited differential action is executed when needed. This prevents the second electric motor from reaching the high speed rotation.

The engine and the second electric motor are connected to each other via the differential mechanism. Therefore, under a circumstance where the shifting portion is placed in the neutral state, if output torque of the engine is large, the rotation speed of the second electric motor is caused to easily increase, resulting in the possibility of the second electric motor easily rotating at the high speed rotation. In this respect, with the invention in the fourth aspect, under a circumstance where when output torque of the engine reaches a high level exceeding the given engine torque determining value, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric motor from reaching the high speed rotation.

With the invention in the fifth aspect, under a circumstance where when the rotation speed of the second electric motor reaches a high speed rotation exceeding the given second-motor rotation speed determining value, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric motor from reaching the high speed rotation.

The second electric motor and the input shaft of the shifting portion are connected to each other and the rotation speed of the second electric motor increases with an increase in the rotation speed of the input shaft. In this respect, with the invention in the sixth aspect, under a circumstance where when the rotation speed of the input shaft reaches a high speed rotation exceeding the given input-shaft rotation speed determining value, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric motor from reaching the high speed rotation.

The second electric motor and the shifting portion are connected to each other and the rotation speed of the second electric motor increases with an increase in the rotation speed of a clutch engaging element incorporated in the shifting portion. In this respect, with the invention in the seventh aspect, under a circumstance where when the rotation speed of the clutch engaging element, incorporated in the shifting portion, reaches a high speed rotation exceeding the given engaging-element rotation speed determining value, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric motor from reaching the high speed rotation.

With the invention in the eighth aspect, under a circumstance where when the drive-force connecting/disconnecting means interrupts the power transmitting path, the differential action limiting device is rendered operative to limit the differential action of the differential mechanism. Therefore, the limitation of such a differential action causes the engine, to which the differential mechanism is connected, to provide rotational resistance to the second electric motor to prevent the same from increasing in rotation speed, while easily controlling the second electric motor so as to rotate at a speed below the permit i.e. allowable rotation speed. This results in capability of preventing the second electric motor from reaching the high speed rotation.

With the invention in the ninth aspect, the differential mechanism includes the first rotary element connected to the engine for the drive-force transmitting capability, the second rotary element connected to the first electric motor for the drive-force transmitting capability, and the third rotary element connected to the power transmitting path to which the drive wheels are connected. The differential action limiting device suppresses the relative rotation of at least the two rotary elements among the first to third rotary elements, thereby executing the operation to limit the differential action of the differential mechanism.

With such an operation is executed to limit the differential action, accordingly, the first to third rotary elements are brought into unitary rotation or nearly unitary rotation state. This makes it possible to easily allow rotational resistance of the engine, to which the first rotary element is connected, to suppress an increase in the rotation speed of the second electric motor or to easily control the second electric motor at a speed below the permit i.e. allowable rotation speed. This results in the possibility of preventing the second electric motor from reaching the high speed rotation.

With the invention in the tenth aspect, the electrically controlled differential portion is rendered operative to function as the continuously variable transmission with controlling the operating state of the first electric motor. This allows the electrically controlled differential portion and the shifting portion to constitute the continuously variable transmission, enabling drive torque to be smoothly varied. In addition, the electrically controlled differential portion can have not only the function to operate as the electrically controlled continuously variable transmission upon continuously varying the speed ratio but also the function to operate as the step-variable transmission upon stepwise varying the speed ratio.

Preferably, when the shifting portion is brought into the neutral state during the running of the vehicle, the operation is executed based on output torque of the engine and the rotation speed of the second electric motor to determine whether to cause the differential action limiting device to limit the differential action of the differential mechanism. With such an operation, no limited differential action is executed in a case where the second electric motor can be easily controlled at a speed below the permit rotation speed even in the absence of the limited differential action and such a limited differential action is executed when needed. This prevents the second electric motor from reaching the high speed rotation.

Preferably, when the shifting portion is brought into the neutral state during the running of the vehicle, the differential action limiting device is rendered operative to limit the differential action under situations described below. A first situation corresponds to a case under which the rotation speed of the second electric motor exceeds the given first-motor rotation speed determining value for determining whether to cause the differential action limiting device to limit the differential action. A second situation corresponds to a case under which the rotation speed of the second electric motor exceeds the given second-motor rotation speed determining value, laying at a lower value than the given first-motor rotation speed determining value, and output torque of the engine exceeds the given engine torque determining value. With such an operation, no limited differential action is executed in a case where the second electric motor can be easily controlled at a speed below the permit rotation speed even in the absence of the limited differential action and such a limited differential action is executed when needed. This prevents the second electric motor from reaching the high speed rotation.

BEST MODE FOR CARRYING OUT THE INVENTION

Now, various embodiments of the present invention will be described below in detail with reference to accompanying drawings.

Embodiment 1

Figures 1, 2:
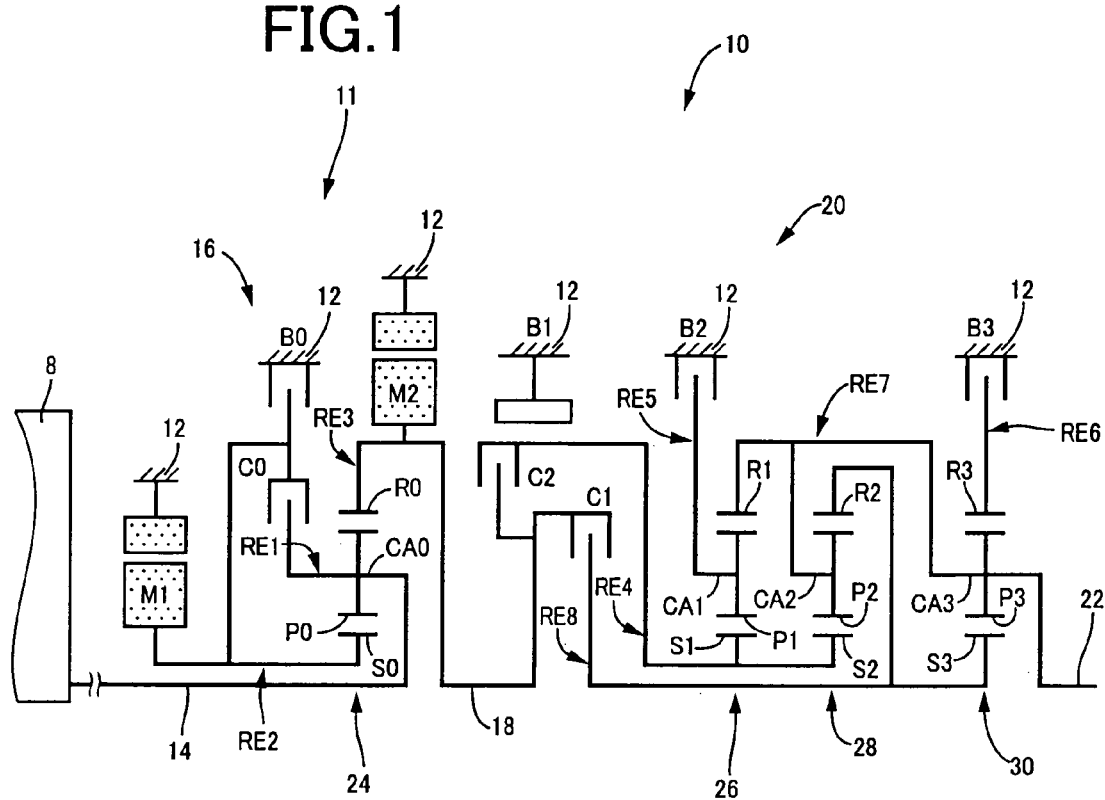
FIG. 1 is a skeleton view explaining a structure of a hybrid vehicle drive apparatus to which a control device of the present invention is applied.
FIG. 2 is an engagement operation table illustrating the relationship between a shifting operation, in which the hybrid vehicle drive apparatus, shown in FIG. 1, is placed in a continuously variable or step-variable shifting state, and the operation of a hydraulic-type frictional engaging device in combination.

FIG. 1 is a skeleton view illustrating a shifting mechanism 10, forming part of a drive apparatus for a hybrid vehicle, to which a control device of one embodiment according to the present invention is applied. As shown in FIG. 1, the shifting mechanism 10 includes an input shaft 14 serving as an input rotary member, a differential portion 11 directly connected to the input shaft 14 or indirectly connected thereto through a pulsation absorbing damper (vibration damping device) not shown, an automatic shifting portion 20 connected via a power transmitting member (transmission shaft) 18 in series through a power transmitting path between the differential mechanism 11 and drive wheels 38 (see FIG. 6) to serve as a step-variable type transmission, and an output shaft 22 connected to the automatic shifting portion 20 as an output rotary member, all of which are disposed in a transmission casing 12 (hereinafter briefly referred to as a "casing 12") serving as a non-rotary member connectedly mounted on a vehicle body.

Figure 6:
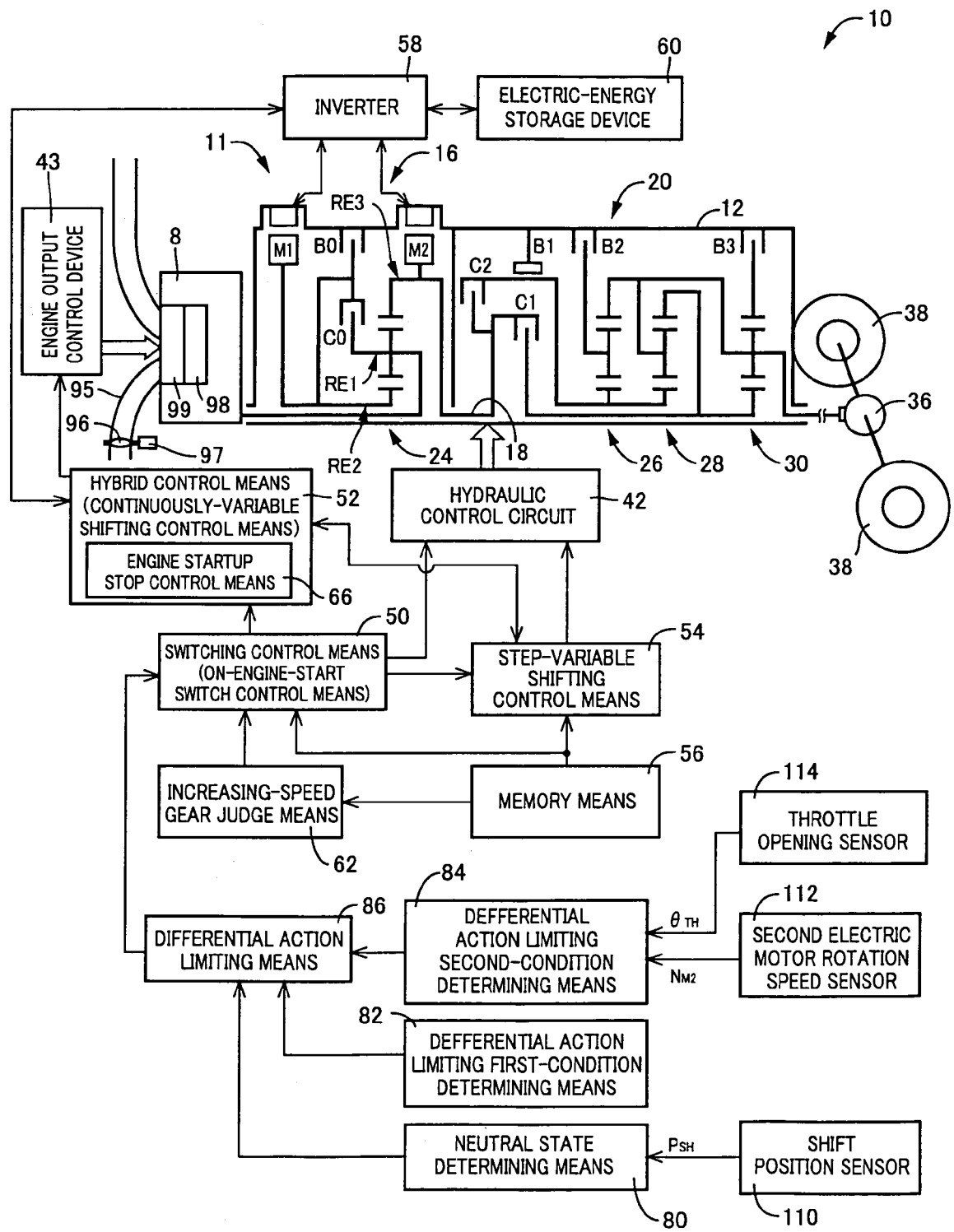
FIG. 6 is a functional block diagram illustrating a major control function to be executed by the electronic control device related to a first embodiment shown in FIG. 4.

The shifting mechanism 10, preferably applicable to a vehicle of FR type (front-engine rear-drive type), is disposed between a longitudinally mounted engine 8, i.e., an internal combustion engine such as a gasoline engine or a diesel engine serving as a drive force directly connected to the input shaft 14 or indirectly connected thereto via the pulsation absorbing damper, and a pair of drive wheels 38 (FIG. 6). This allows a vehicle drive force to be transmitted to the pair of drive wheels 38 on left and right in sequence through a differential gear device 36 (final speed reduction gear) and a pair of drive axles.

With the shifting mechanism 10 of the present embodiment, the engine 8 and the differential portion 11 are connected to each other in a direct connection. As used herein, the term "direct connection" may refer to a connection, established without intervening any fluid-type transmitting device such as a torque converter or a fluid coupling, which involves a connection established with the use of the vibration damping device. Upper and lower halves of the shifting mechanism 10 are structured in symmetric relation with respect to an axis of the shifting mechanism 10 and, hence, the lower half is omitted in the skeleton view of FIG. 1.

The differential portion 11 can be said to be an electrically controlled differential portion in respect of an operation in which a differential state is altered using a first electric motor. The differential portion 11 includes a first electric motor M1, a power distributing mechanism 16 serving as a mechanical mechanism like a differential mechanism through which an output of the engine 8, inputted to the input shaft 14, is transferred to the first electric motor M1 and the power transmitting member 18, and a second electric motor M2 unitarily rotatable with the power transmitting member 18.

Further, the second electric motor M2 may be disposed at any portion of the power transmitting path extending from the power transmitting member 18 to the drive wheels 38. Moreover, the first and second electric motors M1 and M2 are so-called motor/generators each having a function even as an electric power generator. The first electric motor M1 has at least one function as an electric power generator that generates a reactive force, and the second electric motor M2 has at least a function as an electric motor serving as a drive force source to generate a drive force to run the vehicle.

The power distributing mechanism 16, corresponding to the differential mechanism of the present invention, mainly includes a differential-portion planetary gear unit 24 of a single pinion type having a given gear ratio ρ0 of, for instance, about "0.418", a switching clutch C0 and a switching brake B0. The differential-portion planetary gear unit 24 includes rotary elements, such as a differential-portion sun gear S0, a differential-portion planetary gears P0, a differential-portion carrier CA0 supporting the differential-portion planetary gears P0 to be rotatable about its axis and about the axis of the differential-portion sun gear S0, and a differential-portion ring gear R0 meshing with the differential-portion sun gear S0 through the differential-portion planetary gears P0. With the differential-portion sun gear S0 and the differential-portion ring gear R0 assigned to have the numbers of teeth represented by ZS0 and ZR0, respectively, the gear ratio ρ0 is expressed as ZS0/ZR0.

With the power distributing mechanism 16 of such a structure, the differential-portion carrier CA0 is connected to the input shaft 14, i.e., to the engine 8; the differential-portion sun gear S0 is connected to the first electric motor M1; and the differential-portion ring gear R0 is connected to the power transmitting member 18. The switching brake B0 is disposed between the differential-portion sun gear S0 and the casing 12, and the switching clutch C0 is disposed between the differential-portion sun gear S0 and the differential-portion carrier CA0. With both the switching clutch C0 and the switching brake B0 being disengaged, the power distributing mechanism 16 is rendered operative such that the differential-portion sun gear S0, the differential-portion carrier CA0 and the differential-portion ring gear R0, forming the three elements of the differential-portion planetary gear unit 24, are caused to rotate relative to each other to enable the operation in a differential action, i.e., in a differential state under which the differential action is effectuated.

Thus, the output of the engine 8 is distributed to the first electric motor M1 and the power transmitting member 18 with a part of the engine output distributed to the first electric motor M1 being used to generate electric energy to be stored in a battery or to drivably rotate the second electric motor M2. This renders the differential portion 11 (power distributing mechanism 16) operative as an electrically controlled differential device. Thus, the differential portion 11 is placed in a so-called continuously variable shifting state (electrically controlled CVT state), in which a rotation speed of the power transmitting member 18 varies in a continuous fashion regardless of the engine 8 operating at a given rotation speed.

That is, as the power distributing mechanism 16 is placed in the differential state, the differential portion 11 is also placed in differential state. In this casing, the differential portion 11 is placed in the continuously variable shifting state to operate as the electrically controlled continuously variable transmission with a speed ratio $\gamma 0$ (a ratio of rotation speed of the driving device input shaft 14 to the rotation speed of the power transmitting member 18) continuously varying in a value ranging from a minimum value $\gamma 0 \min$ to a maximum value $\gamma 0 \max$.

Under such a state, as the switching clutch C0 or the switching brake B0 is engaged, the power distributing mechanism 16 is disenabled to perform the differential action, i.e., placed in a non-differential state in which no differential action is effectuated. In particular, as the switching clutch C0 is engaged to cause the differential-portion sun gear S0 and the differential-portion carrier CA0 to be unitarily coupled to each other, the power distributing mechanism 16 is placed in a locked state under which the differential-portion sun gear S0, the differential-portion carrier CA0 and the differential-portion ring gear R0, serving as the three elements of the differential-portion planetary gear unit 24, are caused to rotate together, i.e., in a unitarily rotating state under the non-differential state in which no differential action is effectuated. Thus, the differential portion 11 is placed in the non-differential state. Therefore, the rotation speeds of the engine 8 and the power transmitting member 18 coincide with each other, so that the differential portion 11 (power distributing mechanism 16) is placed in a fixed shifting state, i.e., a step-variable shifting state to function as a transmission with the speed ratio $\gamma 0$ connected to a value of "1".

Instead of the switching clutch C0, next, if the switching brake B0 is engaged to connect the differential-portion sun gear S0 to the casing 12, then, the power distributing mechanism 16 is placed in the locked state. Thus, the differential-portion sun gear S0 is placed in the non-rotating state under the non-differential state in which no differential action is initiated, causing the differential portion 11 to be placed in the non-differential state.

Since the differential-portion ring gear R0 rotates at a speed higher than that of the differential-portion carrier CA0, the power distributing mechanism 16 functions as a speed-increasing mechanism. Thus, the differential portion 11 (power distributing mechanism 16) is placed in the fixed shifting state, i.e., the step-variable shifting state to perform a function as a speed-increasing transmission with the speed ratio $\gamma 0$ connected to a value smaller than "1", i.e., for example, about 0.7. In view of the operations set forth above, it can be said that the switching clutch C0, operative to unitarily couple the differential-portion sun gear S0 and the differential-portion carrier CA0 to each other, corresponds to a differential action limiting device of the present invention.

With the present embodiment, the switching clutch C0 and the switching brake B0 selectively place the shifting state of differential portion 11 (power distributing mechanism 16) in the differential state, i.e., the unlocked state and the non-differential state, i.e., the locked state. That is, the switching clutch C0 and the switching brake B0 serves as a differential state switching device that selectively switches the differential portion 11 (power distributing mechanism 16) in one of the continuously variable shifting state and the fixed shifting state.

The continuously variable shifting state is operative to perform the electrically and continuously controlled variable shifting operation, under which the differential portion 11 (power distributing mechanism 16) is placed in the differential state (coupled state) to perform the function as the electrically controlled differential device operative to function as the continuously variable transmission with, for instance, the shifting ratio is continuously variable. In the fixed shifting state, the differential portion 11 (power distributing mechanism 16) is placed in the shifting state, disenabling the function of the electrically controlled continuously variable shifting operation, such as the locked state disenabling the function of the continuously variable transmission in which no continuously variable shifting operation is effectuated with a speed ratio being locked at a connected level.

In the locked state, the differential portion 11 (power distributing mechanism 16) is rendered operative as a transmission of a single-stage or a multi-stage with a speed ratio of one kind or speed ratios of more than two kinds to function in the fixed shifting state (non-differential state), disenabling the electrically controlled continuously variable shifting operation, under which the differential portion 11 (power distributing mechanism 16) operates as the transmission of the single-stage or the multi-stage with the speed ratio kept at a connected level.

The automatic shifting portion 20 includes a first planetary gear unit 26 of a single-pinion type, a second planetary gear unit 28 of a single-pinion type and a third planetary gear unit 30 of a single-pinion type. The first planetary gear unit 26 includes a first sun gear S1, first planetary gears P1, a first carrier CA1 supporting the first planetary gears P1 to be rotatable about its axis and about the axis of the first sun gear S1, and a first differential-portion ring gear R0 meshing with the first sun gear S1 via the first planetary gears P1, having a gear ratio $\rho 1$ of, for instance, about "0.562". The second planetary gear unit 28 includes a second sun gear S2, second planetary gears P2, a second carrier CA2 supporting the second planetary gears P2 to be rotatable about its axis and about the axis of the second sun gear S2, and a second ring gear R2 meshing with the second sun gear S2 via the second planetary gears P2, having for example a gear ratio $\rho 2$ of about. "0.425".

The third planetary gear unit 30 includes a third sun gear S3, third planetary gears P3, a third carrier CA4 supporting the third planetary gears P3 to be rotatable about its axis and about the axis of the third sun gear S3, and the third ring gear R3 meshing with the third sun gear S3 through the third planetary gears P3, having a gear ratio $\rho 3$ of about "0.421". With the first sun gear S1, the second sun gear S2, the second ring gear R2, the third sun gear S3 and the third ring gear R3 assigned to have the numbers of teeth represented by ZS1, ZR1, ZS2, ZR2, ZS3 and ZR3, respectively, the gear ratios $\rho 1$, $\rho 2$ and $\rho 3$ are represented by ZS1/ZR1, ZS2/ZR2, and ZS3/ZR3, respectively.

With the automatic shifting portion 20, the first sun gear S1 and the second sun gear S2 are integrally connected to each other and selectively connected to the power transmitting member 18 through a second clutch C2 while selectively connected to the casing 12 through a first brake B1. The first carrier CA1 is selectively connected to the casing 12 through a second brake B2 and the third ring gear R3 is selectively connected to the casing 12 through a third brake B3. The first differential-portion ring gear R0, the second carrier CA2 and the third carrier CA3 are integrally connected to each other and also connected to the output shaft 22. The second ring gear R2 and the third sun gear S3 are integrally connected to each other and selectively connected to the power transmitting member 18 through the first clutch C1.

Thus, the automatic shifting portion 20 and the power transmitting member 18 are selectively connected to each other through the first clutch C1 or the second clutch C2 used for establishing a gear shift position in the automatic shifting portion 20. In other words, the first clutch C1 and the second clutch C2 collectively function as an engaging device for switching the operations of the power transmitting member 18 and the automatic shifting portion 20. That is, such an engaging device selectively switches a power transmitting path between the differential portion 11 (transmitting member 18) and the drive wheels 38 in a power transmitting state, enabling a power transfer through the power transmission path, and a power interrupting state interrupting the power transfer through the power transmission path. That is, with at least one of the first clutch C1 and the second clutch C2 being engaged, the power transmitting path is placed in the power transmitting state. In contrast, with both the first clutch C1 and the second clutch C2 being disengaged, the power transmitting path is placed in the power interrupting state.

The switching clutch C0, the first clutch C1, the second clutch C2, the switching brake B0, the first brake B1, the second brake B2 and the third brake B3 are hydraulic-type frictionally coupling devices used in a vehicular step-variable type automatic transmission of the related art. An example of the frictionally coupling device includes a wet-type multiple-disc type that includes a plurality of superposed friction plates pressed against each other with a hydraulic actuator or a band brake comprised of a rotary drum having an outer circumferential surface on which one band or two bands are wound to be tightened at one ends with a hydraulic actuator to allow associated component parts, between which the rotary drum intervenes, to be selectively connected to each other.

With the shifting mechanism 10 of such a structure, as indicated in an engagement operation Table shown FIG. 2, the switching clutch C0, the first clutch C1, the second clutch C2, the switching brake B0, the first brake B1, the second brake B2 and the third brake B3 are selectively engaged in operation. This selectively establishes either one of a 1st-speed gear position (1st-speed gear shift position) to a 5th-speed gear position (5th-speed gear shift position) or one of a reverse-drive gear position (reverse-drive gear shift position) and a neural position with a speed ratios γ (input-shaft rotation speed $N_{IN}$/output-shaft rotation speed $N_{OUT}$) varying in nearly equal ratio for each gear position.

In particular, with the present embodiment, the power distributing mechanism 16 is comprised of the switching clutch C0 and the switching brake B0, either one of which is engaged in operation. This makes it possible to cause the differential portion 11 to be placed in the continuously variable shifting state enabling the operation as the continuously variable transmission while establishing the fixed shifting state enabling the transmission to operate with the speed ratio maintained at a fixed level. With either one of the switching clutch C0 and the switching brake B0 being engaged in operation, accordingly, the differential portion 11 is placed in the fixed shifting state to cooperate with the automatic shifting portion 20 to allow the shifting mechanism 10 to operate as the step-variable transmission placed in the step-variable shifting state. With both of the switching clutch C0 and the switching brake B0 being disengaged in operation, the differential portion 11 is placed in the continuously variable shifting state to cooperate with the automatic shifting portion 20 to allow the shifting mechanism 10 to operate as the electrically controlled continuously variable transmission placed in the continuously variable shifting state.

In other words, the shifting mechanism 10 is switched to the step-variable shifting state, upon engagement of either one of the switching clutch C0 and the switching brake B0, and the continuously variable shifting state with both of the switching clutch C0 and the switching brake B0 being brought into disengagement. In addition, it can be said that the differential portion 11 is the transmission that can also be switched to the step-variable shifting state and the continuously variable shifting state.

For example, as shown in FIG. 2, under a circumstance where the shifting mechanism 10 is caused to function as the step-variable transmission, engaging the switching clutch C0, the first clutch C1 and the third brake B3 results in the 1st-speed gear position with the speed ratio γ1 having a maximum value of, for instance, about "3.357". Engaging the switching clutch C0, the first clutch C1 and the second brake B2 results in the 2nd-speed gear position with the speed ratio γ2 of, for instance, about "2.180", which is lower than that of the 1st-speed gear position.

Engaging the switching clutch C0, the first clutch C1 and the first brake B1 results in the 3rd-speed gear position with the speed ratio γ3 of, for instance, about "1.424", which is lower than that of the 2nd-speed gear position. Engaging the switching clutch C0, the first clutch C1 and the second clutch C2 results in the 4th-speed gear position with the speed ratio γ4 of, for instance, about "1.000", which is lower than that of the 3rd-speed gear position.

With the first clutch C1, the second clutch C2 and the switching brake B0 being engaged, the 5th-speed gear position is established with the speed ratio γ5 of, for example, about "0.705", which is smaller than that of the 4th-speed gear position. With the second clutch C2 and the third brake B3 being engaged, further, the reverse-drive gear position is established with the speed ratio γR of, for example, about "3.209", which lies at a value between those of the 1st- and 2nd-speed gear positions. For the neutral "N" state to be established, for instance, all the clutches and the brakes C0, C1, C2, B0, B1, B2 and B3 are disengaged. In addition, the clutches and the brakes C1, C2, B1, B2 and B3, incorporated in the automatic shifting portion 20, serve as clutch engaging elements for enabling the connection or disconnection of the power transmitting path from the differential portion 11 to the drive wheels 38. Accordingly, these component elements collectively correspond to power disconnecting means. Thus, it can be said that the automatic shifting portion 20 also functions as such power disconnecting means.

However, for the shifting mechanism 10 to function as the continuously variable transmission, both the switching clutch C0 and the switching brake B0 are disengaged as indicated in the engagement operation table shown in FIG. 2. With such operation, the differential portion 11 is rendered operative to function as the continuously variable transmission and the automatic shifting portion 20, connected thereto in series, is rendered operative to function as the step-variable transmission. This causes the rotation speed input to the automatic shifting portion 20, i.e., the rotation speed of the power transmitting member 18 to be continuously varied for each of the 1st-speed gear position, the 2nd-speed gear position, the 3rd-speed gear position and the 4th-speed gear position. This allows each of the various gear positions to be established in an infinitely variable shifting ratio. Accordingly, a speed ratio can be continuously variable across the adjacent gear positions, making it possible for the shifting mechanism 10 as a whole to obtain an infinitely variable total speed ratio (overall speed ratio) γT.

Figure 3:
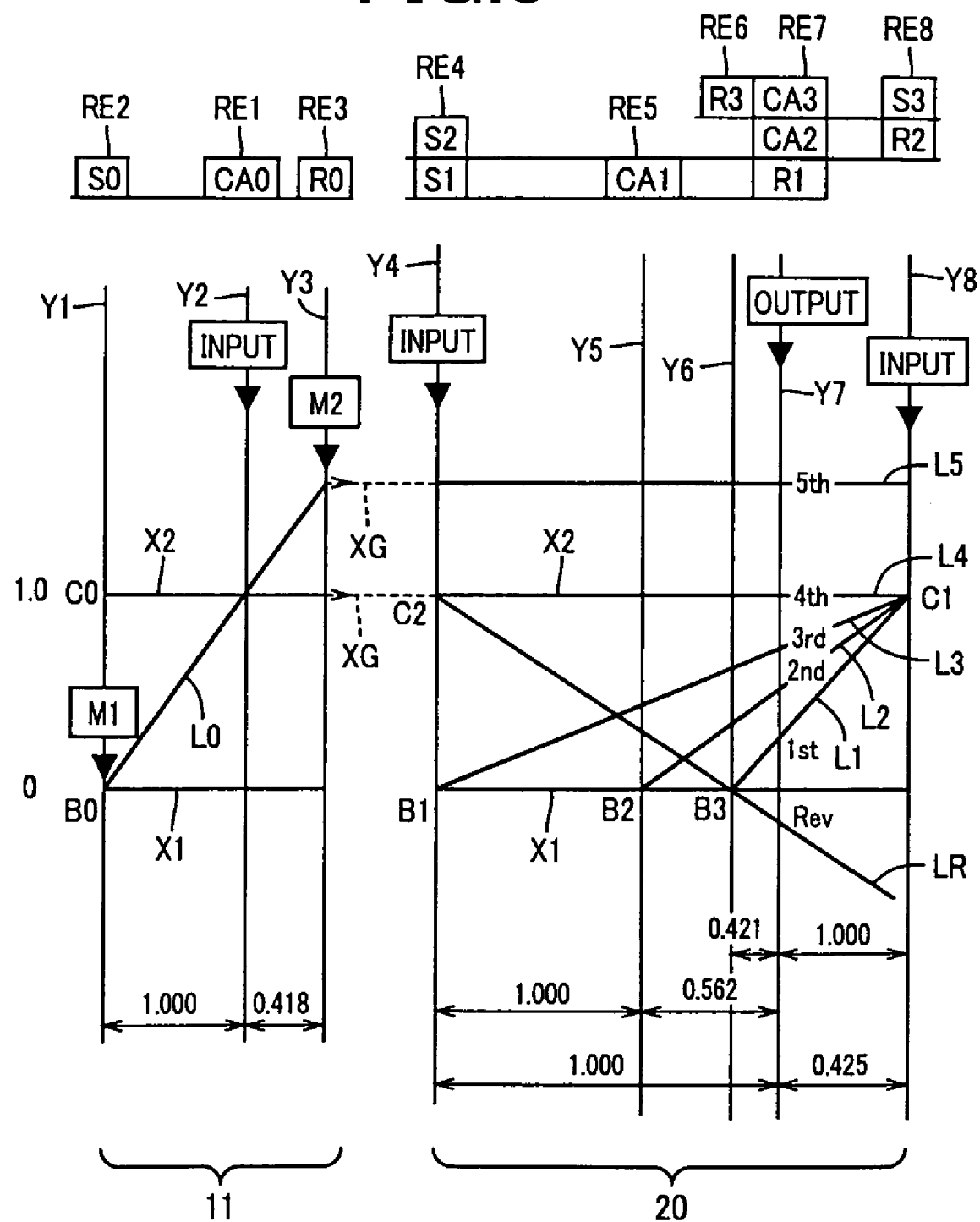
FIG. 3 is a collinear chart illustrating the relative rotation speed of rotary elements in each of different gear positions when the hybrid vehicle drive apparatus, shown in FIG. 1, is caused to operate in the step-variable shifting state.

FIG. 3 shows a collinear chart plotted in straight lines that can represent a correlation among the rotation speeds of the various rotary elements available to accomplish clutch engagement states in different modes depending on the gear positions of the shifting mechanism 10 comprised of the differential portion 11, functioning as the continuously variable shifting portion or the first shifting portion, and the automatic shifting portion 20 functioning as the step-variable shifting portion or the second shifting portion. The collinear chart of FIG. 3 is a two-dimensional coordinate system having the horizontal axis, representing the correlation among the gear ratios ρ established with the planetary gear units 24, 26, 28 and 30, and the vertical axis representing relative rotation speeds of the rotary elements. The lowermost line X1 of three horizontal lines indicates the rotation speed laying at a value of "0". An upper horizontal line X2 indicates the rotation speed laying at a value of "1.0", that is, a rotation speed $N_E$ of the engine 8 connected to the input shaft 14. The uppermost horizontal line XG indicates the rotation speed of the power transmitting member 18.

Starting from the left, three vertical lines Y1, Y2 and Y3, corresponding to the three elements forming the differential portion 11, respectively, represent relative rotation speeds of the differential-portion sun gear S0 corresponding to a second rotary element (second element) RE2, the differential-portion carrier CA0 corresponding to a first rotary element (first element) RE1, and the differential-portion ring gear R0 corresponding to a third rotary element (third element) RE3. A distance between adjacent ones of the vertical lines Y1, Y2 and Y3 is determined in accordance with the gear ratio ρ0 of the differential-portion planetary gear unit 24.

Starting from the left, five vertical lines Y4, Y5, Y6, Y7 and Y8 for the automatic shifting portion 20 represent relative rotation speeds of the first and second sun gears S1 and S2 corresponding to a fourth rotary element (fourth element) RE4 and connected to each other, the first carrier corresponding to a fifth rotary element (fifth element) RE5, the third ring gear R3 corresponding to a sixth rotary element (sixth element) RE6, the first differential-portion ring gear R0 and the second and third carriers CA2 and CA3 corresponding to a seventh rotary element (seventh element) RE7 and connected to each other, and the second ring gear R2 and the third sun gear S3 corresponding to an eighth rotary element (eighth element) RE8 and connected to each other, respectively. A distance between the adjacent ones of the vertical lines Y4 to Y8 is determined based on the gear ratios ρ1, ρ2 and ρ3 of the first to third planetary gear units 26, 28 and 30.

In the correlation between the vertical lines on the collinear chart, if an interval between the sun gear and the carrier is assigned to a distance corresponding to a value of "1", an interval between the carrier and the ring gear is assigned to a distance corresponding to the gear ratio ρ of the planetary gear unit. That is, for the differential portion 11, an interval between the vertical lines Y1 and Y2 is assigned to a distance corresponding to a value of "1" and an interval between the vertical lines Y2 and Y3 is assigned to a distance corresponding to a value of "ρ". For each of the first to third planetary gear units 26, 28 and 30 of the automatic shifting portion 20, further, an interval between the sun gear and the carrier is assigned to a distance corresponding to a value of "1" and an interval between the carrier and the ring gear is assigned to a distance corresponding to the gear ratio ρ.

Expressing the structure using the collinear chart shown in FIG. 3, the shifting mechanism 10 of the present embodiment takes the form of a structure including the power distributing mechanism 16 (continuously variable shifting portion 11). With the power distributing mechanism 16, the differential-portion planetary gear unit 24 has the first rotary element RE1 (differential-portion carrier CA0) connected to the input shaft 14, i.e., the engine 8, while selectively connected to the second rotary element RE2 (differential-portion sun gear S0) through the switching clutch C0, the second rotary element RE2 connected to the first electric motor M1 while selectively connected to the casing 12 through the switching brake B0, and the third rotary element RE3 (differential-portion ring gear R0) connected to the power transmitting member 18 and the second electric motor M2. Thus, the rotation of the input shaft 14 is transmitted (input) to the automatic shifting portion (step-variable shifting portion) 20 through the power transmitting member 18. An inclined straight line L0, passing across an intersecting point between the lines Y2 and X2, represents the correlation between the rotation speeds of the differential-portion sun gear S0 and the differential-portion ring gear R0.

For example, as the switching clutch C0 and the switching brake B0 are disengaged, the shifting mechanism 10 is switched to the continuously variable shifting state (differential state). In this case, controlling the rotation speed of the first electric motor M1 causes the rotation speed of the differential-portion sun gear S0, represented by an intersecting point between the straight line L0 and the vertical line Y1, to increase or decrease. Under such a state, if the rotation speed of the differential-portion ring gear R0, bound with the vehicle speed V, remains at a nearly fixed level, then, the rotation speed of the differential-portion carrier CA0, represented by the intersecting point between the straight line L0 and the vertical line Y2, is caused to increase or decrease.

With the switching clutch C0 being engaged to couple the differential-portion sun gear S0 and the differential-portion carrier CA0 to each other, the power distributing mechanism 16 is brought into the non-differential state where the three rotary elements are caused to integrally rotate as a unitary unit. Thus, the straight line L0 matches the lateral line X2, so that the power transmitting member 18 is caused to rotate at the same rotation speed as the engine rotation speed $N_E$.

In contrast, with the switching brake B0 being engaged to halt the rotation of the differential-portion sun gear S0, the power distributing mechanism 16 is brought into the non-differential state to function as the speed increasing mechanism. Thus, the straight line L0 describes a state as shown in FIG. 3, under which the rotation of the differential-portion ring gear R0, i.e., the power transmitting member 18, represented by an intersecting point between the straight line L0 and the vertical line Y3, is input to the automatic shifting portion 20 at a rotation speed higher than the engine rotation speed $N_E$.

With the automatic shifting portion 20, the fourth rotary element RE4 is selectively connected to the power transmitting member 18 through the second clutch C2 and selectively connected to the casing 12 through the first brake B1. The fifth rotary element RE5 is selectively connected to the casing 12 through the second brake B2 and the sixth rotary element RE6 is selectively connected to the casing 12 through the third brake B3. The seventh rotary element RE7 is connected to the output shaft 22 and the eighth rotary element RE8 is selectively connected to the power transmitting member 18 through the first clutch C1.

As shown in FIG. 3, with the automatic shifting portion 20, upon engagement of the first clutch C1 and the third brake B3, the rotation speed of the output shaft 22 for the 1st-speed gear position is represented by an intersecting point between the inclined straight line L1 and the vertical line Y7 representing the rotation speed of the seventh rotary element RE7 connected to the output shaft 22. Here, the inclined straight line L1 passes across an intersecting point between the vertical line Y8, indicative of the rotation speed of the eighth rotary element RE8, and the horizontal line X2, and an intersecting point between the vertical line Y6, indicative of the rotation speed of the sixth rotary element RE6, and the horizontal line X1.

Similarly, the rotation speed of the output shaft 22 for the 2nd-speed gear position is represented by an intersecting point between an inclined straight line L2, determined upon engagement of the first clutch C1 and the second brake B2, and the vertical line Y7 indicative of the rotation speed of the seventh rotary element RE7 connected to the output shaft 22. The rotation speed of the output shaft 22 for the 3rd-speed gear position is represented by an intersecting point between an inclined straight line L3, determined upon engagement of the first clutch C1 and the first brake B1, and the vertical line Y7 indicative of the rotation speed of the seventh rotary element RE7 connected to the output shaft 22. The rotation speed of the output shaft 22 for the 4th-speed gear position is represented by an intersecting point between a horizontal line L4, determined upon engagement of the first and second clutches C1 and C2, and the vertical line Y7 indicative of the rotation speed of the seventh rotary element RE7 connected to the output shaft 22.

For the 1st-speed to 4th-speed gear positions, the switching clutch C0 remains engaged. Therefore, a drive force is applied from the differential portion 11, i.e., the power distributing mechanism 16 to the eighth rotary element RE8 at the same rotation speed as that of the engine rotation speed $N_E$. However, in place of the switching clutch C0, if the switching clutch B0 is engaged, then, the drive force is applied from the differential portion 11 to the eighth rotary element RE8 at a higher rotation speed than the engine rotation speed $N_E$. Thus, an intersecting point between a horizontal line L5 and the vertical line Y7 represents the rotation speed of the output shaft 22 for the 5th-speed gear position. Here, the horizontal line L5 is determined upon engagement of the first clutch C1, the second clutch C2 and the switching brake B0 and the vertical line Y7 represents the rotation speed of the seventh rotary element RE7 connected to the output shaft 22.

Figure 4:
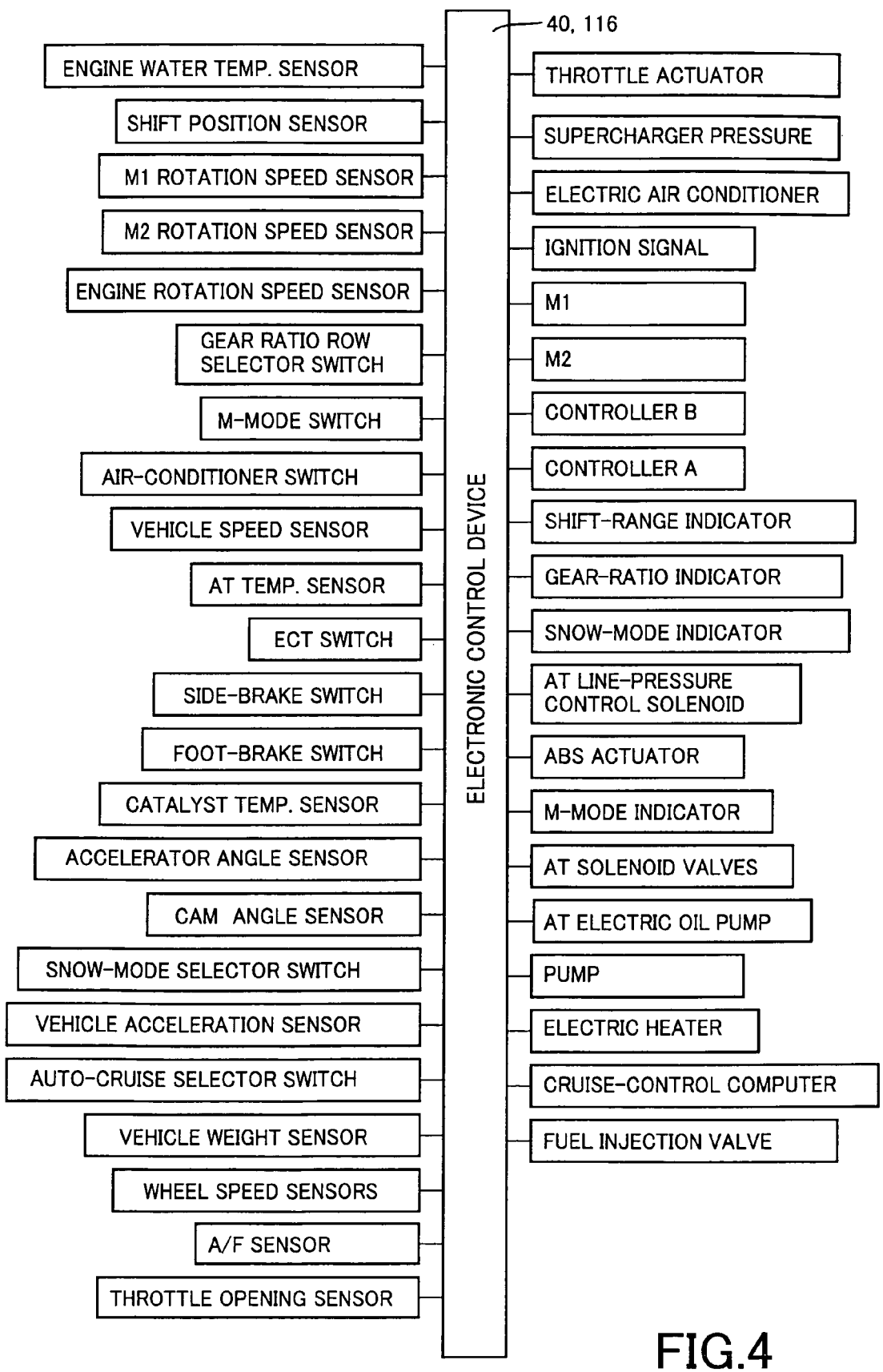
FIG. 4 is a view illustrating input and output signals to be input to or output from an electronic control device incorporated in the hybrid vehicle drive apparatus shown in FIG. 1.

FIG. 4 exemplarily shows various input signals applied to an electronic control device 40, serving as a control device for controlling the shifting mechanism 10 forming part of the hybrid vehicle drive apparatus according to the present invention, and various output signals delivered from the electronic control device 40. The electronic control device 40 includes a so-called microcomputer incorporating a CPU, a ROM, a RAM and an input/output interface. With the microcomputer operated to perform signal processing according to programs preliminarily stored in the ROM while utilizing a temporary data storage function of the ROM, hybrid drive controls are conducted to control the engine 8 and the first and second electric motors M1 and M2, while executing drive controls such as shifting controls of the automatic shifting portion 20.

The electronic control device 40 is applied with the various input signals from various sensors and switches shown in FIG. 4. These input signals include a signal indicative of an engine cooling water temperature $TEMP_W$, a signal indicative of a selected shift position $P_{SH}$, a signal indicative of a rotation speed $N_{M1}$ (hereinafter, referred to as a "first-motor rotation speed $N_{M1}$") of the first electric motor M1, a signal indicative of a rotation speed $N_{M2}$ (hereinafter, referred to as a "second-motor rotation speed $N_{M2}$") of the second electric motor M2, a signal indicative of the engine rotation speed $N_E$ representing the rotation speed of the engine 8, a signal indicative of a set value of gear ratio row, a signal commanding an "M" mode (manually shift drive mode), and an air-conditioning signal indicative of the operation of an air conditioner, etc.

Besides the input signals described above, the electronic control device 40 is further applied with other various input signals. These input signals include a signal indicative of the vehicle speed V corresponding to the rotation speed $N_{OUT}$ of the output shaft 22, a working oil temperature signal indicative of a working oil temperature of the automatic shifting portion 20, a signal indicative of a side brake being operated, a signal indicative of a foot brake being operated, a catalyst temperature signal indicative of a catalyst temperature, an accelerator opening signal indicative of a displacement value $A_{CC}$ of an accelerator pedal corresponding to an output demand value required by a driver, a cam angle signal, a snow mode setting signal indicative of a snow mode being set, an acceleration signal indicative of a fore and aft acceleration of the vehicle, an auto-cruising signal indicative of the vehicle running under an auto-cruising mode, a vehicle weight signal indicative of a weight of the vehicle, a drive wheel velocity signal indicative of a wheel velocity of each drive wheel, a signal indicative of an air-fuel ratio A/F of the engine 8, and a signal indicative of a throttle valve opening $\theta_{TH}$, etc.

The electronic control device 40 generates various control signals to be applied to an engine output control device 43 (refer to FIG. 6) for controlling the engine output. These control signals include, for instance, a drive signal applied to a throttle actuator 97 for controlling an opening degree $\theta_{TH}$ of a throttle valve 96 disposed in an intake manifold 95 of the engine 8, a fuel supply quantity signal to be applied to a fuel injection device 98 for controlling the amount to fuel to be supplied to each cylinder of the engine 8, an ignition signal to be applied to an ignition device 99 for commanding an ignition timing of the engine 8, a supercharger pressure regulating signal for adjusting a supercharger pressure level, an electric air-conditioner drive signal for actuating an electric air-conditioner, and command signals for commanding the operations of the first and second electric motors M1 and M2.

Besides the control signals described above, the electronic control device 40 generates various output signals. These output signals include a shift-position (selected operating position) display signal for activating a shift indicator, a gear-ratio display signal for providing a display of the gear ratio, a snow-mode display signal for providing a display of a snow mode under operation, an ABS actuation signal for actuating an ABS actuator for preventing slippages of the drive wheels during a braking effect, an M-mode display signal for displaying the M-mode being selected, valve command signals for actuating electromagnet valves incorporated in a hydraulically operated control circuit 42 (see FIG. 6) to control the hydraulic actuators of the hydraulically operated frictional engaging devices of the differential portion 11 and the automatic shifting portion 20, drive command signals for actuating a hydraulic pressure pump serving as a hydraulic pressure source of the hydraulically operated control circuit 42, a signal for driving an electric heater, and signals applied to a cruise-control computer, etc.

Figure 5:
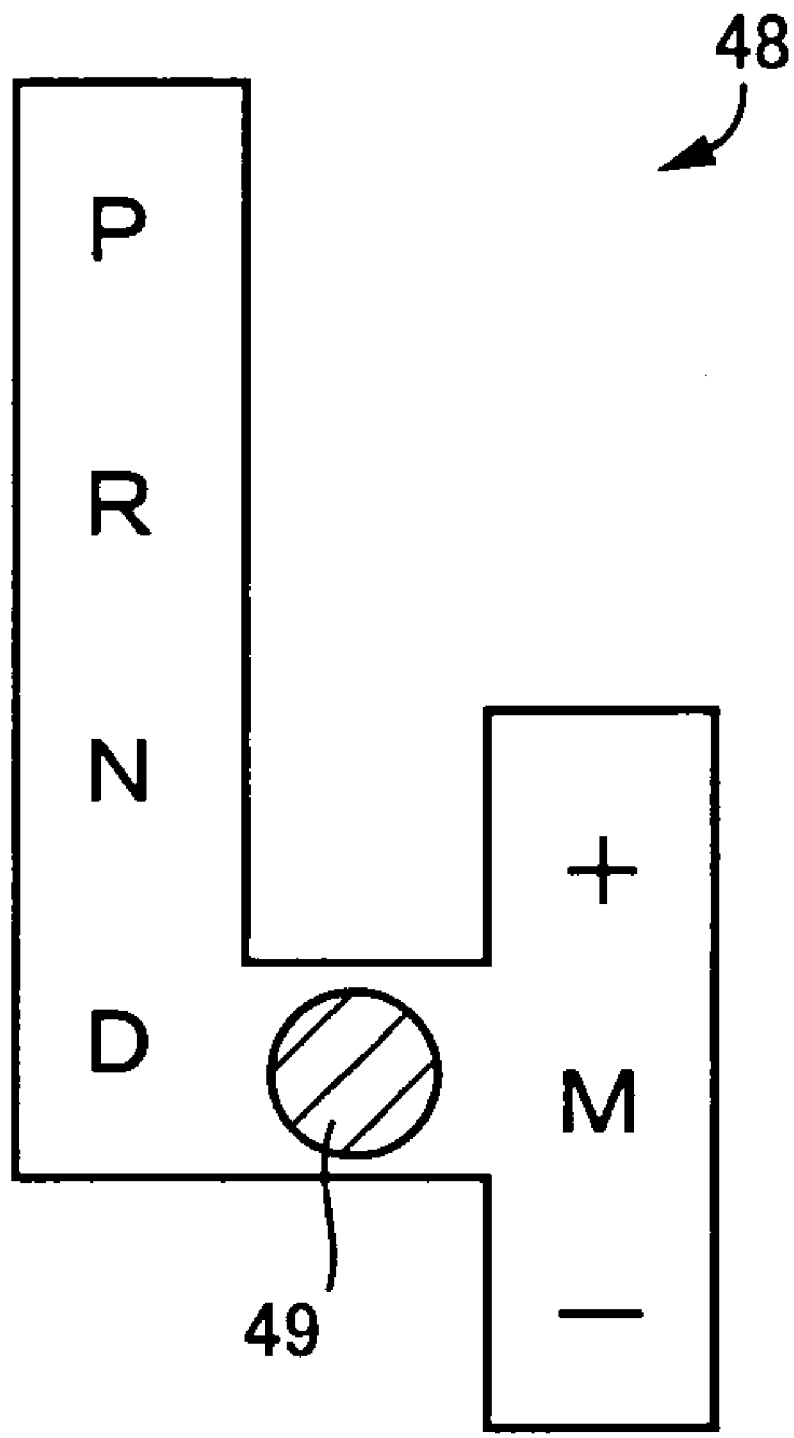
FIG. 5 is a view showing one sample of a shift operating device provided with a shift lever for operating to select one of plural kinds of shift positions.

FIG. 5 is a view showing one sample of a shift operating device 48, serving as a switching device, which is manually operated to select one of the shift positions $P_{SH}$ of multiple kinds. The shift operating device 48 includes a shift lever 49 mounted aside, for example, a driver's seat to be manually operated to select one of the shifting positions of the plural kinds.

The shift lever 49 has a structure arranged to be selectively shifted in manual operation to be set to one of a parking position "P" (Parking) under which the shifting mechanism 10, i.e., the automatic shifting portion 20, is placed in the neutral state interrupting the power transmitting path of the shifting mechanism 10, i.e., the automatic shifting portion 20, a reverse drive running position "R" (Reverse) for the vehicle to run in a reverse drive mode, a neutral position "N" (Neutral) for the neutral state to be established under which the power transmitting path of the shifting mechanism 10 is interrupted, a forward drive automatic shift position "D" (Drive) for an automatic shift control to be executed within a varying range of the total speed ratio γT that can be shifted with the shifting mechanism 10, and a forward drive manual shift position "M" (Manual) under which a manual shift running mode (manual mode) is established to set a so-called shift range that limits the shift gear positions in a high speed range during the execution of the automatic shift control.

In conjunction with the shift lever 49 being manually operated to each of the shift positions $P_{SH}$, for instance, the hydraulic control circuit 42 is electrically switched in such a way to establish each of the gear shift positions such as the reverse drive position "R", the neutral position "N" and the forward drive position "D" as shown in the engagement operation table shown in FIG. 2.

Among the various shift positions $P_{SH}$ covering "P" to "M" positions, the "P" and "N" positions represent the non-running positions selected when no intension is present to run the vehicle. For the "P" and "N" positions to be selected, both the first and second clutches C1 and C2 are disengaged, as shown in, for example, the engagement operation table of FIG. 2, and non-drive positions are selected to place the power transmitting path in the power cutoff i.e. interrupted state. This causes the power transmitting path of the automatic shifting portion 20 to be interrupted, disenabling the vehicle to be driven.

The "R", "D" and "M" positions represent running positions selected when the vehicle is caused to run. These shift positions also represent drive positions selected when switching the power transmitting path to the power transmitting state under which at least one of the first and second clutches C1 and C2 is engaged as shown in, for instance, the engagement operation table of FIG. 2. With such shifting positions selected, the power transmitting path of the automatic shifting portion 20 is connected to enable the vehicle to be driven.

More particularly, with the shift lever 49 manually operated from the "P" position or the "N" position to the "R" position, the second clutch C2 is engaged so that the power transmitting path of the automatic shifting portion 20 is switched from the power cutoff state to the power transmitting state. With the shift lever 49 manually operated from the "N" position to the "D" position, at least the first clutch C1 is engaged, causing the power transmitting path of the automatic shifting portion 20 to be switched from the power cutoff state to the power transmitting state.

With the shift lever 49 manually operated from the "R" position to the "P" position or the "N" position, the second clutch C2 is disengaged, causing the power transmitting path of the automatic shifting portion 20 to be switched from the power transmitting state to the power cutoff state. With the shift lever 49 manually operated from the "D" position to the "N" position, the first and second clutches C1 and C2 are disengaged, causing the power transmitting path of the automatic shifting portion 20 to be switched from the power transmitting state to the power cutoff state.

Figure 7:
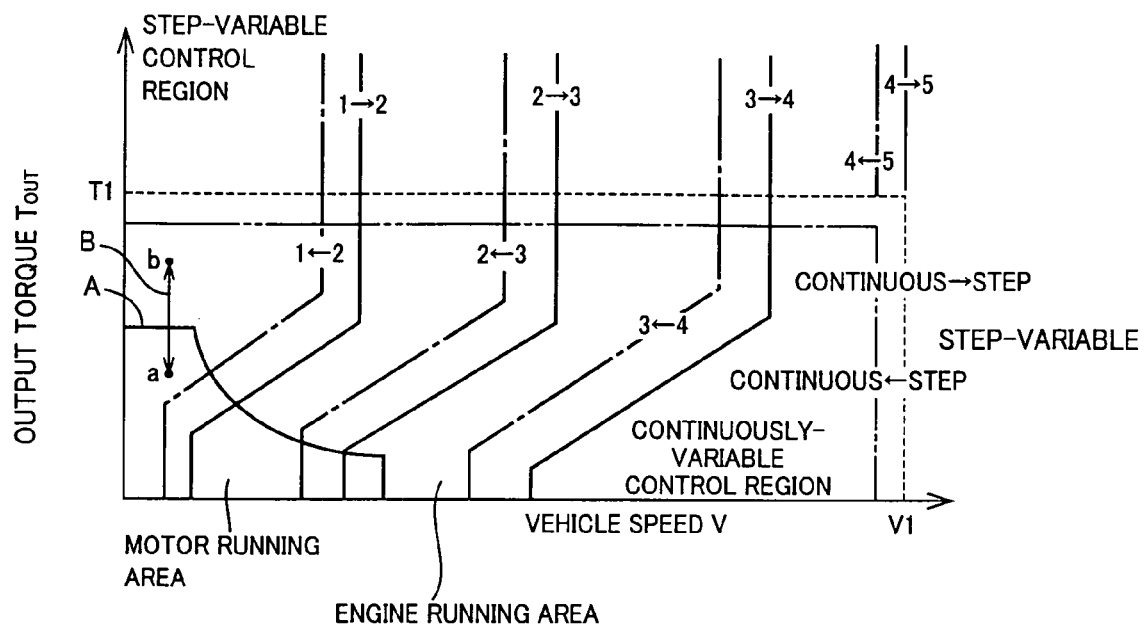
FIG. 7 is a view representing, one example of a preliminarily stored shifting diagram, plotted on a two-dimensional coordinate in terms of parameters including a vehicle speed and output torque, based on which the operation is executed whether to a shifting is executed in an automatic shifting portion; one example of preliminarily stored diagram, based on which a shifting state of the shifting mechanism is switched; and one example of a preliminarily stored drive-force source switching diagram having a boundary line between an engine drive region and a motor drive region based on which an engine drive mode and a motor drive mode is switched.

FIG. 6 is a functional block diagram illustrating an essential part of a control function to be performed with the electronic control device 40. In FIG. 6, step-variable shifting control means 54 functions as shifting control means for the shifting the shifting the automatic shifting portion 20. For instance, the step-variable shifting control means 54 discriminates whether to execute the shifting in the automatic shifting portion 20 on the basis of a vehicle condition represented by the vehicle speed V and the demanded output torque $T_{OUT}$ for the automatic shifting portion 20 by referring to the relationships (including the shifting diagram and the shifting map), preliminarily stored in memory means 56, which are plotted in solid lines and single dot lines as shown in FIG. 7.

That is, the step-variable shifting control means 54 discriminates a shifting position to be shifted in the automatic shifting portion 20, thereby causing the automatic shifting portion 20 to execute the shifting so as to obtain the discriminated shifting position. When this takes place, the step-variable shifting control means 54 outputs a command (shifting output command) to the hydraulic control circuit 42 for engaging and/or disengaging the hydraulically operated frictional engaging devices, excepting the switching clutch C0 and the switching brake B0, so as to achieve a desired shifting position in accordance with, for instance, the engagement operation table shown in FIG. 2.

Hybrid control means 52 renders the engine 8 operative in an operating region at high efficiency under the infinitely variable shifting state of the shifting mechanism 10, i.e., the differential state of the differential portion 11. At the same time, the hybrid control means 52 causes the engine 8 and the second electric motor M2 to deliver drive forces at varying distributing rates while causing the first electric motor M1 to generate electric power at a varying rate for a reactive force to be generated at an optimum value, thereby controlling the speed ratio γ0 of the differential portion 11 placed in the electrically controlled continuously variable transmission.

For instance, during the running of the vehicle at a current vehicle speed, the hybrid control means 52 calculates a target (demanded) output of the vehicle by referring to the displacement value Acc of the accelerator pedal and the vehicle speed V that collectively represents the output demanded value intended by the driver. Then, the hybrid control means 52 calculates a demanded total target output based on the target output and a charging request value of the vehicle. In order to obtain the total target output, the hybrid control means 52 calculates a target engine output with taking account of the transmitting a loss, loads on auxiliary units and assisting torque of the second electric motor M2, etc. Then, the hybrid control means 52 controls the engine 8 so as to provide the engine rotation speed $N_E$ and engine torque $T_E$ such that the target engine output is obtained, while controlling the first electric motor M1 to generate electric power at a proper power rate.

The hybrid control means 52 executes a hybrid control with taking account of the gear position of the automatic shifting portion 20 so as to obtain power performance and improved fuel consumption. During such a hybrid control, the differential portion 11 is rendered operative to function as the electrically controlled continuously variable transmission for the purpose of matching the engine rotation speed $N_E$, determined for the engine 8 to operate at a high efficiency, to the rotation speed of the power transmitting member 18 determined based on the vehicle speed V and the selected gear position of the automatic shifting portion 20.

To this end, the hybrid control means 52 preliminarily stores therein an optimum fuel economy curve (including a fuel economy map and relevant relationships) of the engine 8 preliminarily determined on an experimental basis such that, during the running of the vehicle under the continuously variable shifting state, the vehicle has drivability and fuel economy performance in compatibility on a two-dimensional coordinate with parameters including, for instance, the engine rotation speed $N_E$ and output torque (engine torque) $T_E$ of the engine 8.

In order to cause the engine 8 to operate on such an optimum fuel economy curve, a target value on the total speed ratio γT of the shifting mechanism 10 is determined so as to obtain engine torque $T_E$ and the engine rotation speed $N_E$ for the demanded engine output to be generated so as to satisfy, for instance, the target output (total target output and demanded drive force). To achieve such a target value, the hybrid control means 52 controls the speed ratio γ0 of the differential portion 11, while controlling the total speed ratio γT within a variable shifting range at a value, for instance, ranging from 13 to 0.5.

During such hybrid control, the hybrid control means 52 allows electric energy, generated by the first electric motor M1, to be supplied to a battery 60 and the second electric motor M2 through an inverter 58. This allows a major part of the drive force, delivered from the engine 8, to be mechanically transmitted to the power transmitting member 18 and the rest of the drive force of the engine is delivered to the first electric motor M1 to be consumed thereby for conversion to electric power. The resulting electric energy is supplied through the inverter 58 to the second electric motor M2, which in turn is driven to provide a drive force for delivery to the power transmitting member 18. Equipments, involved in the operation of generating electric energy and the operation causing the second electric motor M2 to consume electric energy, establish an electric path in which the part of the drive force, delivered from the engine 8, is converted to electric energy which in turn is converted into mechanical energy.

The hybrid control means 52 functionally includes engine output control means for executing an output control of the engine 8 so as to provide the demanded engine output. The engine output control means allows the throttle actuator 97 to perform a throttle control so as to controllably open or close the electronic throttle valve 96. In addition, the engine output control means outputs commands to the engine output control device 43 so as to cause the fuel injection device 98 to control the fuel injection quantity and fuel injection timing for performing a fuel injection control while permitting the ignition device 99, such as an igniter or the like, to control an ignition timing for an ignition timing control. These commands are output in a single mode or a combined mode. For instance, the hybrid control means 52 drives the throttle actuator 97 in response to the acceleration opening signal Acc by fundamentally referring to the preliminarily stored relationship, not shown, so as to execute the throttle control such that the greater the accelerator opening Acc, the greater will be the throttle valve opening $\theta_{TH}$.

A solid line A, shown in FIG. 7, represents a boundary line between an engine drive region and a motor drive region for the engine 8 and an electric motor, i.e., for instance, the second electric motor M2 to be selectively switched as a drive force source for the vehicle to perform a startup/running (hereinafter referred to as "running"). In other words, the boundary line is used for switching a so-called engine drive mode, in which the engine 8 is caused to act as a running drive force source for starting up/running (hereinafter referred to as "running") the vehicle, and a so-called motor drive mode in which the second electric motor M2 is caused to act as a drive force source for running the vehicle.

The preliminarily stored relationship, having the boundary line (in the solid line A) shown in FIG. 7 for the engine drive region and the motor drive region to be switched, represents one example of a drive-force source switching diagram (drive force source map), formed on a two-dimensional coordinate, which includes parameters such as the vehicle speed V and output torque $T_{OUT}$ representing a drive force correlation value. Memory means 56 preliminarily stores such a drive-force source switching diagram together with the shifting diagram (shifting map) designated by, for instance, the solid line and the single dot line in FIG. 7.

The hybrid control means 52 determines which of the motor drive region and the engine drive region is to be selected based on the vehicle condition, represented by the vehicle speed V and demanded torque output $T_{OUT}$ by referring to, for instance, the drive-force source switching diagram shown in FIG. 7, thereby executing the motor drive mode or the engine drive mode. Thus, the hybrid control means 52 executes the motor drive mode at relatively low output torque $T_{OUT}$, i.e., low engine torque $T_E$, at which an engine efficiency is generally regarded to be lower than that involved a high torque region, or a relatively low vehicle speed range of the vehicle speed V, i.e., under a low load region as will be apparent from FIG. 7.

During such a motor drive mode, the hybrid control means 52 renders the differential portion 11 operative to perform an electrical CVT function (differential function) for controlling the first-motor rotation speed $N_{M1}$ at a negative rotation speed, i.e., at an idling speed to maintain the engine rotation speed $N_E$ at a zeroed or nearly zeroed level, thereby minimizing a drag of the engine 8, remained under a halted state, for providing improved fuel economy.

The hybrid control means 52 includes engine-startup stop controlling means 66 that switches an operating state of the engine 8 between a drive state and a stop state to select one of the engine drive mode and the motor drive mode. As used herein, the term "switches" refers to an operation in which the engine 8 is started up or stopped in operation. With the hybrid control means 52 executed the operation based on the vehicle condition by referring to, for instance, the drive-force source switching diagram shown in FIG. 7 to determine that the motor drive mode and the engine drive mode need to be switched, the engine-startup stop controlling means 66 executes the operation to start up or stop the engine 8.

If the accelerator pedal is depressed in operation to cause an increase in demanded engine output torque $T_{OUT}$, the vehicle condition varies from the motor drive region to the engine drive region as shown by a transition in points "a"→"b" on a solid line B in FIG. 7. When this takes place, the engine-startup stop controlling means 66 turns on the first electric motor M1 to raise the first-motor rotation speed $N_{M1}$. That is, the first electric motor M1 is rendered operative to function as a starter. This allows the engine 8 to start up with an increase in the engine rotation speed $N_E$. During such operation, the engine-startup stop controlling means 66 causes the ignition device 99 to initiate an ignition at a given engine rotation speed $N_E'$, i.e., for instance, at an engine rotation speed $N_E$ enabling an autonomous rotation, after which the hybrid control means 52 switches the motor drive mode to the engine drive mode.

During such operation, the engine-startup stop controlling means 66 may cause the first-motor rotation speed $N_{M1}$ to immediately raise for increasing the engine rotation speed $N_E$ up to the given engine rotation speed $N_E'$. This can immediately avoid the occurrence of a resonating region from an engine rotating speed region remaining below an idling rotation speed $N_{EIDLE}$ that is well known, thereby suppressing the possibility of the engine 8 vibrating at startup thereof.

If the accelerator pedal is released with a decrease in demanded engine output torque $T_{OUT}$, the vehicle condition varies from the engine drive region to the motor drive region as shown by another transition in points "b"-"a" on the solid line B in FIG. 7. When this takes place, the engine-startup stop controlling means 66 causes the fuel injection device 98 to interrupt the supply of fuel to the engine 8. That is, a fuel cutoff operation is executed to stop the engine 8. In such a way, the hybrid control means 52 switches the engine drive mode to the motor drive mode. During such an operation, the engine-startup stop controlling means 66 may execute the operation to immediately lower the first-motor rotation speed $N_{M1}$ for immediately lowering the engine rotation speed $N_E$ to a zeroed or nearly zeroed level. This immediately avoids the engine 8 from entering the resonating region, thereby suppressing the possibility of the engine 8 vibrating at startup thereof.

In an alternative, the engine-startup stop controlling means 66 may execute the operation to stop the engine 8 upon executing an operation to lower the first-motor rotation speed $N_{M1}$ to decrease the engine rotation speed $N_E$ on a stage prior to the fuel cutoff operation being executed for effectuating the fuel cutoff operation at the given engine rotation speed $N_E'$.

Further, even under the engine drive region, the hybrid control means 52 may execute the operation to allow the second electric motor M2 to be supplied with electric energy, generated by the first electric motor M1, and/or electric energy delivered from the battery 60 via the electric path mentioned above. This causes the second electric motor M2 to be driven for performing a torque assisting operation to assist the drive force of the engine 8. Thus, for the illustrated embodiment, the term "engine drive mode" may refer to an operation covering the engine drive mode and the motor drive mode in combination.

Further, the hybrid control means 52 can cause the differential portion 11 to perform the electrical CVT function through which the engine 8 can be maintained under the operating state regardless of the vehicle left in a halted condition or a low speed condition. For instance, if a drop occurs in a state of charge SOC of the battery 60 during the halt of the vehicle with a need occurring on the first electric motor M1 to generate electric power, the drive force of the engine 8 drives the first electric motor M1 to generate electric power with an increase in the rotation speed of the first electric motor M1. Thus, even if the second-motor rotation speed $N_{M2}$, uniquely determined with the vehicle speed V, is zeroed (nearly zeroed) due to the halted condition of the vehicle, the power distributing mechanism 16 performs the differential action, causing the engine rotation speed $N_E$ to be maintained at a level beyond an autonomous rotation speed.

The hybrid control means 52 executes the operation to cause the differential portion 11 to perform the electrical CVT function for controlling the first-motor rotation speed $N_{M1}$ and the second-motor rotation speed $N_{M2}$ to maintain the engine rotation speed $N_E$ at an arbitrary level regardless of the vehicle remaining under the halted or running state. As will be understood from the collinear chart shown in FIG. 3, for instance, when raising the engine rotation speed $N_E$, the hybrid control means 52 executes the operation to maintain the second-motor rotation speed $N_{M2}$, bound with the vehicle speed V, at a nearly fixed level while raising the first-motor rotation speed $N_{M1}$.

In placing the shifting mechanism 10 in the step-variable shifting state, increasing-speed gear-position determining means 62 determines which of the switching clutch C0 and the switching brake B0 is to be engaged. To this end, the increasing-speed gear-position determining means 62 executes the operation based on, for instance, the vehicle condition according to the shifting diagram, shown in FIG. 7, which is preliminarily stored in the memory means 56, to determine whether or not a gear position to be shifted in the shifting mechanism 10 is an increasing-speed gear position, i.e., for instance, a 5th-speed gear position.

Switching control means 50 switches the engaging and/ disengaging states of the differential-state switching means (switching clutch C0 and switching brake B0) based on the vehicle condition, thereby selectively executing a switchover between the continuously variable shifting state and the step-variable shifting state, i.e., between the differential state and the locked state. For instance, the switching control means 50 executes the operation based on the vehicle condition, represented with the vehicle speed V and demanded output torque $T_{OUT}$, by referring to the relationships (shifting diagram and shifting map), preliminarily stored in the memory means 56, which are shown in the broken line and the double dot line in FIG. 7, thereby determining whether to switch the shifting state of the shifting mechanism 10 (differential portion 11). That is, the operation is executed to determine whether there exist a continuously variable shifting control region for the shifting mechanism 10 to be placed in the continuously variable shifting state or a step-variable shifting control region for the shifting mechanism 10 to be placed in the step-variable shifting state. This allows the operation to be executed for determining the shifting state to be switched in the shifting mechanism 10, thereby executing the operation to selectively switch the shifting state to one of the continuously variable shifting state and the step-variable shifting state.

More particularly, if the determination is made that the shifting mechanism 10 lies in the step-variable shifting control region, then, the switching control means 50 outputs a signal to the hybrid control means 52 for disenabling or interrupting the hybrid control or the continuously variable shifting control, while permitting the step-variable shifting control means 54 to perform the shifting for the step-variable shifting operation that has been preliminarily determined. When this takes place, the step-variable shifting control means 54 allows the automatic shifting portion 20 to perform the automatic shifting in accordance with, for instance, the shifting diagram shown in FIG. 7 and preliminarily stored in the memory means 56.

For instance, the engagement operation table, shown in FIG. 2 and preliminarily stored in the memory means 56, represents the operations in combination of the hydraulically operated frictional engaging devices, that is, the clutches C0, C1 and C2 and the brakes B0, B1, B2 and B3 to be selected in such a shifting operation. That is, a whole of the shifting mechanism 10, i.e., the differential portion 11 and the automatic shifting portion 20, functions as a so-called step-variable automatic transmission, thereby establishing the gear positions according to the engagement operation table shown in FIG. 2.

For instance, if the increasing-speed gear-position determining means 62 determines that the 5th-gear position is to be selected, the shifting mechanism 10 as a whole can obtain a so-called overdrive-gear position on an increasing-speed gear position with a speed ratio less than "1.0" as a whole. To this end, the switching control means 50 outputs a command to the hydraulic control circuit 42 for disengaging the switching clutch C0 and engaging the switching brake B0 to allow the differential portion 11 to function as an auxiliary power transmission with a fixed speed ratio γ0, i.e., for instance, the speed ratio γ0 equal to "0.7".

If the increasing-speed gear-position determining means 62 determines that no 5th-gear position is to be selected, the shifting mechanism 10 as a whole can obtain a decreasing-speed gear position with a speed ratio of "1.0" or more. To this end, the switching control means 50 outputs another command to the hydraulic control circuit 42 for engaging the switching clutch C0 and disengaging the switching brake B0 to allow the differential portion 11 to function as the auxiliary power transmission with the fixed speed ratio γ0, i.e., for instance, the speed ratio γ0 equal to "1".

Thus, the switching control means 50 causes the shifting mechanism 10 to be switched in the step-variable shifting state under which the operation is executed to selectively switch the gear positions of two kinds to either one gear position. With the differential portion 11 rendered operative to function as the auxiliary power transmission while the automatic shifting portion 20, connected to the differential portion 11 in series, is rendered operative to function as the step-variable transmission, the shifting mechanism 10 as a whole is rendered operative to function as the so-called step-variable automatic transmission.

On the contrary, if the switching control means 50 determines that the shifting mechanism 10 remains in the continuously variable shifting control region to be switched in the continuously variable shifting state, the shifting mechanism 10 as a whole can obtain the continuously variable shifting state. To this end, the switching control means 50 outputs a command to the hydraulic control circuit 42 for disengaging both the switching clutch C0 and the switching brake B0 so as to place the differential portion 11 in the continuously variable shifting state to enable an infinitely variable shifting operation to be executed. Simultaneously, the switching control means 50 outputs a signal to the hybrid control means 52 for permitting the hybrid control to be executed, while outputting a given signal to the step-variable shifting control means 54. As used herein, the term "given signal" refers to a signal, by which the shifting mechanism 10 is fixed to a gear position for a predetermined continuously variable shifting state, or a signal for permitting the automatic shifting portion 20 to perform the automatic shifting according to, for instance, the shifting diagram, shown in FIG. 7, which is preliminarily stored in the memory means 56.

In this case, the step-variable shifting control means 54 performs the automatic shifting upon executing the operation excepting the operations to engage the switching clutch C0 and the switching brake B0 in the engagement operation table shown in FIG. 2. This causes the switching control means 50 to switch the differential portion 11 to the continuously variable shifting state to function as the continuously variable transmission, while rendering the automatic shifting portion 20, connected to the differential portion 11 in series, operative to function as the step-variable transmission. This allows a drive force to be obtained with an appropriate magnitude. Simultaneously, the rotation speed input to the automatic shifting portion 20, i.e., the rotation speed of the power transmitting member 18 is continuously varied for each gear position of the 1st-speed, 2nd-speed, 3rd-speed and 4th-speed positions of the automatic shifting portion 20, enabling the respective gear positions to be obtained in infinitely variable speed ratio ranges. Accordingly, since the speed ratio is continuously variable across the adjacent gear positions, the shifting mechanism 10 as a whole can obtain the overall speed ratio γT in an infinitely variable mode.

Now, FIG. 7 will be described more in detail. FIG. 7 is a view showing the relationships (shifting diagram and shifting map), preliminarily stored in the memory means 56, based on which the shifting of the automatic shifting portion 20 is determined, and representing one example of the shifting diagram plotted on a two-dimensional coordinate with parameters including the vehicle speed V and demanded output torque $T_{OUT}$ indicative of the drive force correlation value. In FIG. 7, the solid lines represent upshift lines and single dot lines represent downshift lines.

In FIG. 7, the broken lines represent a determining vehicle speed V1 and a determining output torque T1 for the switching control means 50 to determine the step-variable control region and the continuously variable control region. That is, the broken lines represent a high vehicle-speed determining line, forming a series of a determining vehicle speed V1 representing a predetermined high-speed drive determining line for determining a high speed running state of a hybrid vehicle, and a high-output drive determining line, forming a series of determining output torque T1 representing a predetermined high-output drive determining line for determining the drive force correlation value related to the drive force of the hybrid vehicle. As used herein, the term "drive force correlation value" refers to determining output torque T1 that is preset for determining a high output drive for the automatic shifting portion 20 to provide output torque at a high output.

A hysteresis is provided for determining the step-variable control region and the continuously variable control region as indicated by a double dot line in FIG. 7 in contrast to the broken line. That is, FIG. 7 represents a shifting diagram (switching map and relationship), preliminarily stored in terms of the parameters including the vehicle speed V, including the determining vehicle speed V1 and determining output torque T1, and output torque $T_{OUT}$, based on which the switching control means 50 executes the determination on a region as to which of the step-variable control region and the continuously variable control region belongs to the shifting mechanism 10.

The memory means 56 may preliminarily store the shifting map, inclusive of such a shifting diagram. Moreover, the shifting diagram may be of the type that includes at least one of the determining vehicle speed V1 and determining output torque T1 and may include a preliminarily stored shifting diagram with a parameter taking any of the vehicle speed V and output torque $T_{OUT}$.

The shifting diagram, the switching diagram or the drive-force source switching diagram or the like may be stored not in the map but in a determining formula for making comparison between a current vehicle speed V and a determining vehicle speed V1, and another determining formula or the like for making comparison between output torque $T_{OUT}$ and determining output torque T1. In this casing, the switching control means 50 places the shifting mechanism 10 in the step-variable shifting state when the vehicle condition such as, for instance, an actual vehicle speed exceeds the determining vehicle speed V1. In addition, the switching control means 50 places the shifting mechanism 10 in the step-variable shifting state when the vehicle condition such as, for instance, output torque $T_{OUT}$ of the automatic shifting portion 20 exceeds determining output torque T1.

When a malfunction or functional deterioration occurs in electrical control equipment such as an electric motor or the like used for rendering the differential portion 11 operative as the electrically controlled continuously variable transmission, the switching control means 50 may be configured to place the shifting mechanism 10 in the step-variable shifting state on a priority basis for the purpose of ensuring the running of the vehicle to even if the shifting mechanism 10 remains in the continuously variable control region. As used herein, the term "malfunction or functional deterioration in electrical control equipment" refers to a vehicle condition in which: functional degradation occurs in equipment related to the electrical path involved in the operation of the first electric motor M1 to generate electric energy and the operation executed in converting such electric energy to mechanical energy; that is, failures or functional deteriorations, caused by a breakdown or low temperature, occur in the first electric motor M1, the second electric motor M2, the inverter 58, the battery 60 and transmission paths interconnecting these component parts.

As used herein, the term "drive force correlation value" described above refers to a parameter corresponding to the drive force of the vehicle in one-to-one relation. Such a parameter may include not only drive torque or drive force delivered to the drive wheels 38 but also: output torque $T_{OUT}$ of the automatic shifting portion 20; engine output torque $T_E$; an acceleration value of the vehicle; an actual value such as engine output torque $T_E$ calculated based on, for instance, the accelerator operating or the throttle valve opening $\theta_{TH}$ (or an intake air quantity, an air/fuel ratio or a fuel injection amount) and the engine rotation speed $N_E$; or an estimated value such as engine output torque $T_E$ or demanded vehicle drive force calculated based on a displacement value of the accelerator pedal actuated by the driver or the throttle valve operating or the like. In addition, the drive torque may be calculated upon taking a differential ratio and a radius of each drive wheel 38 into consideration by referring to output torque $T_{OUT}$ or the like or may be directly detected using a torque sensor or the like. This is true for each of other torques mentioned above.

For instance, the operation of the shifting mechanism 10 under the continuously variable shifting state during the running of the vehicle at the high speed turns out a consequence of deterioration in fuel economy. The determining vehicle speed V1 is determined to a value that can render the shifting mechanism 10 operative in the step-variable shifting state during the vehicle running at the high speed so as to address such an issue. Further, determining torque T1 is determined to a value that prevents reactive torque of the first electric motor M1 from covering a high output region of the engine during the running of the vehicle at a high output. That is, determining torque T1 is determined to such a value depending on, for instance, a characteristic of the first electric motor M1 that is possibly mounted with a reduced maximum output in electric energy for miniaturizing the first electric motor M1.

Figure 8:
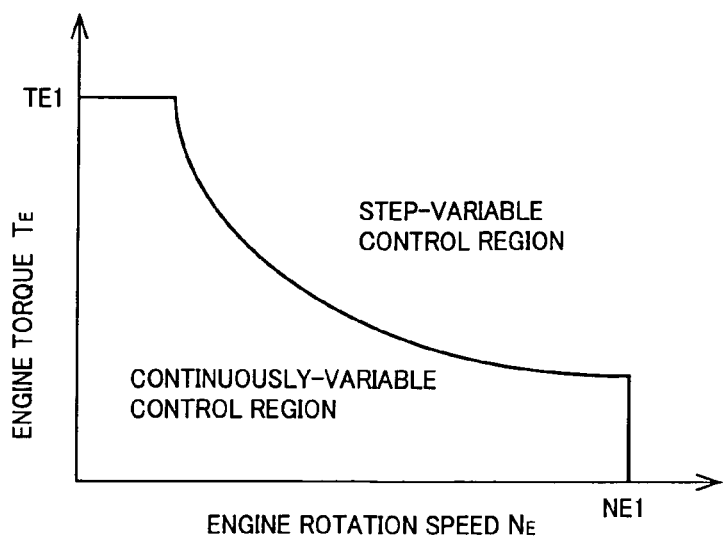
FIG. 8 is a conceptual view, showing the preliminarily stored relationship, involving a boundary line, between a continuously variable control region and a step-variable control region, which is suitable for mapping a boundary between the continuously variable control region and the step-variable control region shown in broken lines in FIG. 7.

FIG. 8 represents a switching diagram (switching map and relationship), preliminarily stored in the memory means 56, which has an engine output line in the form of a boundary line to allow the switching control means 50 to determine a region based on the step-variable control region and the continuously variable control region using parameters including the engine rotation speed $N_E$ and engine torque $T_E$. The switching control means 50 may execute the operation based on the engine rotation speed $N_E$ and engine torque $T_E$ by referring to the switching diagram shown in FIG. 8 in place of the switching diagram shown in FIG. 7. That is, the switching control means 50 may determine whether the vehicle condition, represented with the engine rotation speed $N_E$ and engine torque $T_E$, lies in the step-variable control region or the continuously variable control region.

Further, FIG. 8 is also a conceptual view based on which the broken line in FIG. 7 is to be created. In other words, the broken line in FIG. 7 is also a switching line rewritten on a two-dimensional coordinate in terms of the parameters including the vehicle speed V and output torque $T_{OUT}$ based on the relational diagram (map) shown in FIG. 8.

As indicated on the relationships shown in FIG. 7, the step-variable control region is set to lie in a high torque region, where output torque $T_{OUT}$ is greater than the predetermined determining output torque T1, or a high vehicle speed region where the vehicle speed V is greater than the predetermined determining vehicle speed V1. Therefore, a step-variable shift drive mode is effectuated in a high drive torque region, where the engine 8 operates at relatively high torque, or the vehicle speed remaining in a relatively high speed region. Further, a continuously variable shift drive mode is effectuated in a low drive torque region, where the engine 8 operates at relatively low torque, or the vehicle speed remaining in a relatively low speed region, i.e., during a phase of the engine 8 operating in a commonly used output region.

Figure 9:
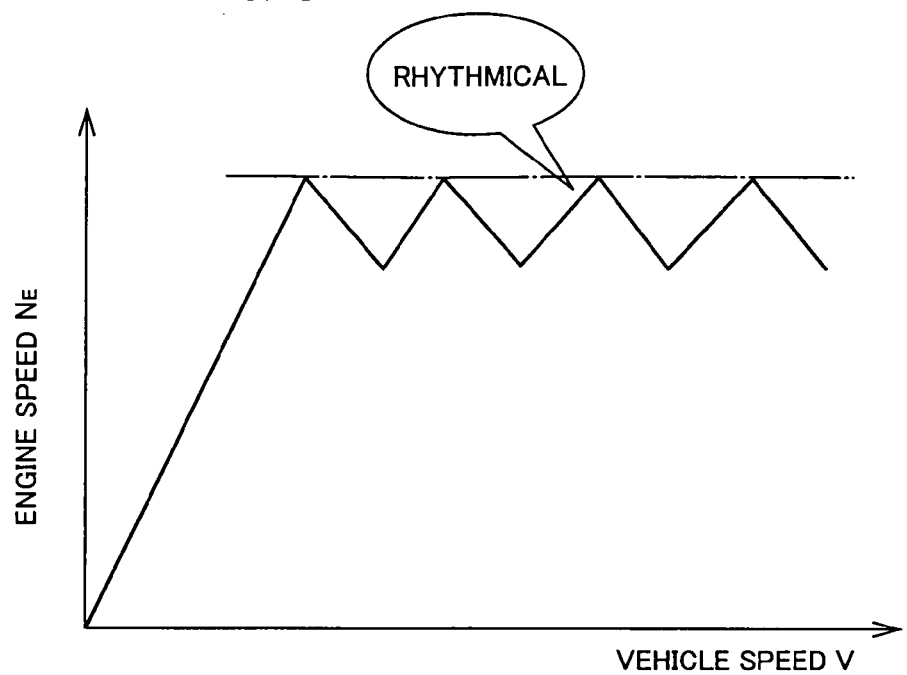
FIG. 9 is a graph showing a fluctuation in an engine rotation speed with an upshift effectuated in a step-variable transmission.

As indicated by the relationship shown in FIG. 8, similarly, the step-variable control region is set to lie in a high-torque region with engine torque $T_E$ exceeding a predetermined given value TE1, a high-speed rotating region with the engine rotation speed $N_E$ exceeding a predetermined given value NE1, or a high output region where the engine output calculated, based on engine torque $T_E$ and the engine rotation speed $N_E$, is greater than a given value. Therefore, the step-variable shift drive mode is effectuated at relatively high torque, relatively high rotation speed or relatively high output of the engine 8. The continuously variable shift drive mode is effectuated at relatively low torque, relatively low rotation speed or relatively low output of the engine 8, i.e., in the commonly used output region of the engine 8. The boundary line, shown in FIG. 9, between the step-variable control region and the continuously variable control region corresponds to a high vehicle-speed determining line which is a series of a high vehicle-speed determining line and a high-output drive determining value which is a series of a high-output drive determining value.

With such a boundary line, for instance, during the running of the vehicle at a low/medium speed and low/medium output, the shifting mechanism 10 is placed in the continuously variable shifting state to ensure the vehicle to have improved fuel economy performance. During the running of the vehicle at a high speed with an actual vehicle speed V exceeding the determining vehicle speed V1, the shifting mechanism 10 is placed in the step-variable shifting state to act as the step-variable transmission. In this moment, the output of the engine 8 is transferred to the drive wheels 38 mainly through a mechanical power transmitting path. This suppresses a loss in conversion between the drive force and electric energy, generated when the shifting mechanism 10 is caused to act as the electrically controlled continuously variable transmission, providing improved fuel consumption.

During the running of the vehicle on the high output drive mode with the drive force correlation value, such as output torque $T_{OUT}$ or the like, which exceeds determining torque T1, the shifting mechanism 10 is placed in the step-variable shifting state to act as the step-variable transmission. In this moment, the output of the engine 8 is transferred to the drive wheels 38 mainly through the mechanical power transmitting path. In this case, the electrically controlled continuously variable transmission is caused to operate in the low/medium speed running region and the low/medium output running region of the vehicle. This enables a reduction in the maximum value of electric energy to be generated by the first electric motor M1, i.e., electric energy to be transmitted by the first electric motor M1, thereby causing the first electric motor M1 per se or a vehicle drive apparatus including such a component part to be further miniaturized in structure.

According to another viewpoint, further, during the running of the vehicle on such a high output drive mode, the driver places more emphasis on a requirement for the drive force and less emphasis on a requirement for a mileage and, thus, the shifting mechanism 10 is switched to the step-variable shifting state (fixed shifting state) rather than to the continuously variable shifting state. With such a switching operation, the driver can enjoy a fluctuation in the engine rotation speed $N_E$, i.e., a rhythmical variation in the engine rotation speed $N_E$ caused by the upshifting in the step-variable automatic shift running mode as shown, for instance, in FIG. 9.

In such a way, the differential portion 11 (shifting mechanism 10) of the present embodiment can be selectively switched to one of the continuously variable shifting state and the step-variable shifting state (fixed shifting state). The switching control means 50 executes the operation based on the vehicle condition to determine the shifting state to be switched in the differential portion 11, thereby causing the shifting state to be selectively switched to either one of the continuously variable shifting state and the step-variable shifting state. With the first embodiment, the engine startup and stop controlling means 66 operates to start up or stop the engine 8 such that the hybrid control means 52 can execute the operation based on the vehicle condition to switch the engine drive mode and the motor drive mode.

Figure 10:
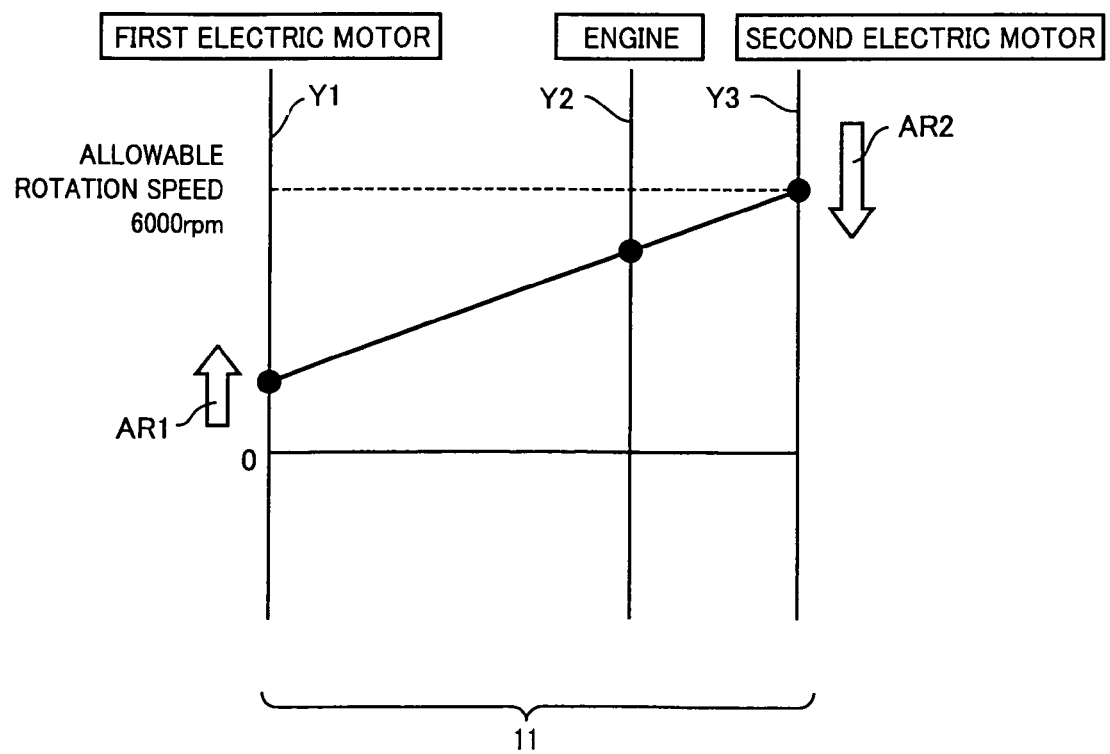
FIG. 10 is a collinear chart, showing the relationships among relative rotation speeds of an engine and first and second electric motors with a switching clutch held in a disengaged state, which illustrates characteristic portions extracted from the collinear chart shown in FIG. 3 and corresponding to those of a differential portion shown therein.

FIG. 10 is a collinear chart showing the relationships among the relative rotation speeds of the engine 8, the first electric motor M1 and the second electric motor M2 with the switching clutch C0 remaining disengaged. Further, FIG. 10 is a view showing characteristic portions corresponding to those of the differential portion 11 extracted from and shown in FIG. 3. Here, if a vehicle occupant manipulates the shift lever 49 into the "N" position during the running of the vehicle, then, the automatic shifting portion 20 is placed in the neutral condition in which the power transmitting path from the second electric motor M2 to the drive wheels 38 is interrupted. Under such a condition, the first and second clutches C1 and C2 are disengaged.

Now, description is made of an operation to be executed for controlling the second electric motor M2 so as to suppress the rotation speed $N_{M2}$, increasing due to a release of a drive load born with the second electric motor M2, to a value below a permit rotation speed $N_{PM2}$, i.e., 6000 rpm, of the second electric motor M2 under a neutral state. As shown by an arrow AR1 in FIG. 10, the first electric motor M1 needs to be driven in a direction to raise the rotation speed $N_{M1}$ whereas as shown by an arrow AR2 in FIG. 10, the second electric motor M2 needs to be driven in a direction to lower the rotation speed $N_{M2}$. That is, the first-motor rotation speed $N_{M1}$, the second-motor rotation speed $N_{M2}$, output torque $T_{M1}$ of the first electric motor M1 and output torque $T_{M2}$ of the second electric motor M2 need to be simultaneously controlled.

However, such a control is so complicated that the second-motor rotation speed $N_{M2}$ increases beyond the permit rotation speed $N_{PM2}$ with a probability of the second electric motor M2 reaching a high speed rotation. Especially, it has been likely that the second electric motor M2 reaches the high speed rotation when the second-motor rotation speed $N_{M2}$ lies at a high level and engine torque lies at a large level. In addition, it has been likely that the second electric motor M2 also similarly reaches the high speed rotation even when first motor torque $T_{M1}$ or second motor torque $T_{M2}$ is adequately obtained.

Hereunder, description is made of a control operation to be executed for preventing the second electric motor M2 from reaching the high speed rotation under a circumstance where the shift lever 49 is switched from, for instance, the "D" position to the "N" position during the running of the vehicle. The expression "switched from the "D" position to the "N" position" represents a motion in which the power transmitting path of the automatic shifting portion 20 is switched from the power transmitting state to the power cutoff i.e. interrupted state during the running of the vehicle.

Turning back to FIG. 6, neutral state determining means 80 is provided for determining whether or not the power transmitting path of the automatic shifting portion 20 is switched from the power transmitting state to the power cutoff state during the running of the vehicle. More particularly, the neutral state determining means 80 executes the operation based on whether or not the shift position $P_{SH}$, detected with a shift position sensor 110, remains in the "N" position, thereby determining whether or not the automatic shifting portion 20 lies in a neutral state, i.e., a neutral condition.

In place of obtaining the shift position $P_{SH}$, the neutral state determining means 80 may execute the operation based on shifting information delivered from the step-variable shifting control means 54 to determine whether or not the automatic shifting portion 20 lies in the neutral state. If it is determined that the automatic shifting portion 20 lies in the neutral state, the neutral state determining means 80 makes a positive determination. If not, a negative determination is made.

Differential-action limiting first-condition determining means 82 determines whether or not the second-motor rotation speed $N_{M2}$ increases beyond the permit i.e. allowable rotation speed $N_{PM2}$, detected with a second-motor rotation speed sensor 112, to reach a high speed rotation exceeding a predetermined first rotation-speed determining value $N_{LMT1}$ (such as, for instance, 6000 rpm). As used herein the term "first rotation-speed determining value $N_{LMT1}$" refers to a threshold value by which it is determined that, under a circumstance where the rotation speed of the second electric motor M2 exceeds the second-motor rotation speed $N_{M2}$ due to the second electric motor M2 rotating at a high speed, a C0-lock control needs to be executed to cause the switching clutch C0 to be engaged. Otherwise, the second-motor rotation speed $N_{M2}$ cannot be controlled to a level below the permit rotation speed $N_{PM2}$. In addition, under a situation where the shift position $P_{SH}$ lies in the "D" position, there is likelihood that the second electric motor M2 reaches a rotation speed beyond the permit rotation speed $N_{PM2}$ for the neutral state.

Differential-action limiting second-condition determining means 84 determines whether or not there are two conditions including: (a) a first condition in which the second-motor rotation speed $N_{M2}$, detected with the second-motor rotation speed sensor 112, lies in a high-speed rotating state exceeding a second rotation-speed determining value $N_{LMT2}$ preset to a value of, for instance, 4000 rpm; and (b) a second condition in which the throttle valve opening $\theta_{TH}$, detected with a throttle opening sensor 114, exceeds a throttle valve opening determining value $\theta_{LMT}$ that is preset to a value of, for instance 60%. If it is determined that both of these two conditions are satisfied, the differential-action limiting second-condition determining means 84 makes a positive determination. If not, a negative determination is executed.

As used herein the term "second rotation-speed determining value $N_{LMT2}$" refers to a threshold value, laying at a lower value than the first rotation-speed determining value $N_{LMT1}$. Under a circumstance where due to a reason of the second electric motor M2 rotating at the high speed with an increase in engine torque $T_E$ being applied to the second electric motor M2, if the second-motor rotation speed $N_{M2}$ and the throttle valve opening determining value $\theta_{LMT}$ exceed the second rotation-speed determining value $N_{LMT2}$ and the throttle valve opening determining value $\theta_{LMT}$, respectively, the C0-lock control needs to be executed. Otherwise, the second-motor rotation speed $N_{M2}$ cannot be controlled to a level below the permit rotation speed $N_{PM2}$. These parameters are obtained on an experimental basis.

The differential-action limiting second-condition determining means 84 may execute the determination using engine torque $T_E$ in place of the throttle valve opening $\theta_{TH}$. In addition, no operation may be executed to determine the first condition (a) related to the second-motor rotation speed $N_{M2}$ while merely executing the operation to determine the condition (b) related to the throttle valve opening $\theta_{TH}$. Further, the C0-lock control is even executed within an extremely short time interval on a stage immediately after the power transmitting path of the automatic shifting portion 20 is interrupted. Thus, in usual practice, no remarkable fluctuation takes place in the vehicle speed V during the execution of the C0-lock control.

The second-motor rotation speed $N_{M2}$ can be calculated based on the vehicle speed V and the speed ratio of the automatic shifting portion 20. Thus, the differential-action limiting first-condition determining means 82 and the differential-action limiting second-condition determining means 84 may execute the determinations using the vehicle speed V in place of the second-motor rotation speed $N_{M2}$. Besides, a vehicle speed determining value, representing the threshold value for determining whether or not the vehicle speed V reaches a high speed, may be a function of the speed ratio of the automatic shifting portion 20.

The second electric motor M2 is coupled to the clutch and the brake, serving as the engaging elements of the automatic shifting portion 20, via the power transmitting member 18 acting as the input shaft of the automatic shifting portion 20. Therefore, the differential-action limiting first-condition determining means 82 and the differential-action limiting second-condition determining means 84 may execute the determinations using the rotation speed of the power transmitting member 18 in place of the second-motor rotation speed $N_{M2}$ or using a rotation speed of the clutch or the brake such as the first clutch C1 or the second clutch C2.

When the differential-action limiting first-condition determining means 82 or the differential-action limiting second-condition determining means 84 makes the positive determination, the differential action limiting means 86 allows the switching control means 50 to execute the C0-lock control, in the presence of the positive determination executed by the neutral state determining means 80. This suppresses the relative rotation between the first and second rotary elements RE1 and RE2, thereby limiting the differential action of the power distributing mechanism 16.

As will be understood from the collinear chart shown in FIG. 3, then, engaging the switching clutch C0 causes the differential portion 11 to be placed in the non-differential state or nearly such a state with the rotary elements RE1 to RE3 rotating in a unitary i.e. integral motion. Thus, the engine 8 (RE1), the first electric motor M1 (RE2) and the second electric motor M2 (RE3) are caused to rotate at the same or nearly identical rotation speeds.

Moreover, the C0-lock control is executed to prevent the second electric motor M2 from rotating at the high speed. To this end, using the engine 8 allows the second electric motor M2 to be applied with a rotational load instead of the running load. Therefore, no need necessarily arises for the C0-lock control to be executed with the switching clutch C0 kept in a completely engaged condition, but the switching clutch C0 may be kept in a half-engaged (slipping) state.

When the differential-action limiting second-condition determining means 84 makes a negative determination, the differential action limiting means 86 allows the switching control means 50 to execute the C0-release control for releasing or disengaging the switching clutch C0. Further, executing the C0-lock control results in the suppression of an increase in the second-motor rotation speed $N_{M2}$. In this moment, as a certain time interval has elapsed after the shift operating device 48 is shifted in the "N" position, both the differential-action limiting first-condition determining means 82 and the differential-action limiting second-condition determining means 84 make the negative determinations. Thereafter, the C0-release control is executed. In other words, even if the C0-lock control is executed, the differential action limiting means 86 allows the switching clutch C0 to be disengaged, except for a certain time interval immediately after the shift operating device 48 has been shifted in the "N" position.

Figure 11:
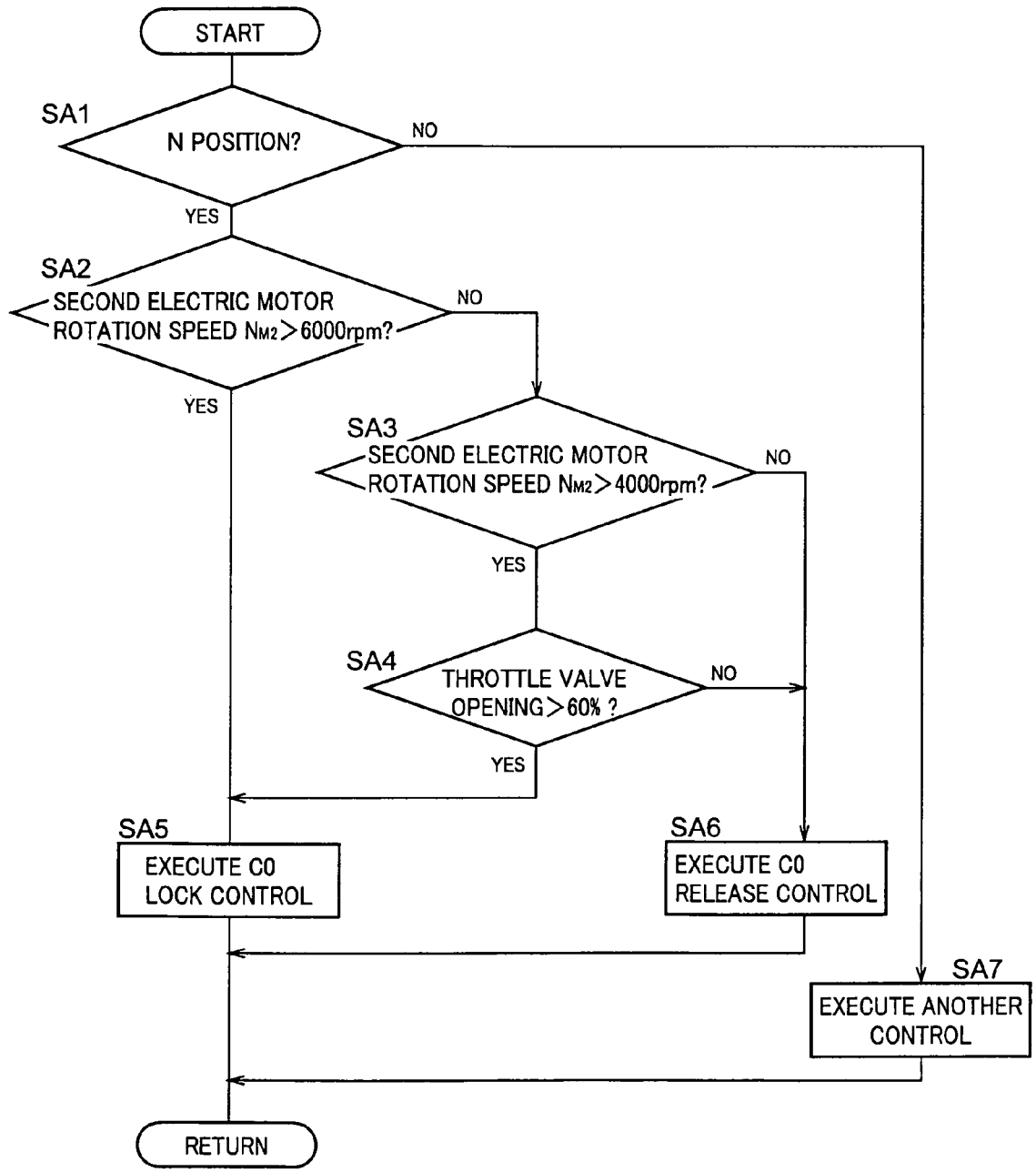
FIG. 11 is a flowchart illustrating a basic sequence of major control operations, i.e., control operations to be executed with the electronic control device shown in FIG. 4 related to the first embodiment for switching a power transmitting path of an automatic shifting portion from a power transmitting state to a power cutoff i.e. interrupted state during the running of a vehicle.

FIG. 11 is a flowchart for illustrating a major part of control operations to be executed by the electronic control device 40. Description is made of the control operations to be executed when the power transmitting path of the automatic shifting portion 20 is switched from the power transmitting state to the power cutoff state during the running of the vehicle. Such a sequence is repeatedly executed in an extremely short cycle time in the order of, for instance, several milliseconds or several tens milliseconds.

During the running of the vehicle, first, in step (hereinafter the term "step" is omitted) SA1 corresponding to the neutral state determining means 80, the operation is executed to determine whether or not the power transmitting path of the automatic shifting portion 20 is switched from the power transmitting state to the power cutoff state. More particularly, the operation is executed, based on whether or not the shift position $P_{SH}$ detected with the shift position sensor 110 lies in the "N" position, to determine whether or not the automatic shifting portion 20 lies in the neutral state, i.e., the neutral condition.

If the determination is made that the automatic shifting portion 20 lies in the neutral state, then, the positive determination is made, and if not, the negative determination is made. If the positive determination is made in SA1, the operation goes to SA2, and in contrast, if the negative determination is made, then, the operation goes to SA7.

In SA2 corresponding to the differential-action limiting first-condition determining means 82, the operation is executed to determine whether or not the second-motor rotation speed $N_{M2}$ is in a high speed rotation state exceeding the predetermined first rotation-speed determining value $N_{LMT1}$. If this determination is made negative, then, the operation proceeds to SA3, and if such determination is made positive, then, the operation proceeds to SA5.

In SA3, the operation is executed to determine whether or not the above-mentioned condition (a) is satisfied, i.e., whether or not the second-motor rotation speed $N_{M2}$, detected with the second-motor rotation speed sensor 112, reaches the high-speed rotation state exceeding the predetermined second rotation-speed determining value $N_{LMT2}$. If a positive determination is made in SA3, then the operation goes to SA4, and if a negative determination is made in SA3, then, the operation goes to SA6.

In SA4, the operation is executed to determine whether or not the condition (b) is satisfied, i.e., whether or not the throttle valve opening $\theta_{TH}$, detected with the throttle opening sensor 114, exceeds the throttle valve opening determining value $\theta_{LMT}$. If a positive determination is made in SA4, then, the operation goes to SA5, and if a negative determination is made in SA4, then, the operation goes to SA6. In addition, SA3 and SA4, determining whether or not the two conditions (a) and (b) are satisfied, collectively correspond to the differential-action limiting second-condition determining means 84.

The C0-lock control is executed in SA5 and a C0-disengagement control is executed. In addition, SA5 and SA6, executing the C0-lock control and the C0-disengagement control, collectively correspond to the differential action limiting means 86.

If the negative determination is made in SA1, i.e., when the shift position $P_{SH}$ does not lay in the "N" position but in the "D" position or the like with the power transmitting path of the automatic shifting portion 20 remaining in the power transmitting state, then, the operation in SA7 is executed. In SA7, the other control such as the shifting control of the automatic shifting portion 20 is executed.

The electronic control device 40 of the embodiment 1 has advantageous effects (1) to (14) as described below.

(1) Under a circumstance where the automatic shifting portion 20 interrupts the power transmitting path from the power distributing mechanism 16 to the drive wheels 38, i.e. in the neutral state of the automatic shifting portion 20, the C0-lock control is executed to allow the differential portion 11 to (power distributing mechanism 16) to limit the differential action. Thus, such a limitation in the differential action makes the second electric motor M2 rotate at a rotation speed below the permit rotation speed $N_{PM2}$, and makes a rotational resistance resulting from the engine 8 act in a direction to prevent an increase in the second-motor rotation speed $N_{M2}$. In such a way, the second electric motor M2 can be prevented from rotating at the high speed.

(2) Under a circumstance where the second-motor rotation speed $N_{M2}$ of the second electric motor M2 reaches a high-speed rotation state exceeding the first rotation-speed determining value $N_{LMT1}$, the C0-lock control is executed. Thus, the limited differential action of the power distributing mechanism 16 easily controls the second electric motor M2 to rotate at the rotation speed below the permit rotation speed $N_{PM2}$, and causes the rotational resistance resulting from the engine 8 to act in the direction to prevent the increase in the second-motor rotation speed $N_{M2}$. In such a way, the second electric motor M2 can be prevented from rotating at the high speed.

(3) In determining operations of the differential-action limiting first-condition determining means 82 and the differential-action limiting second-condition determining means 84, the vehicle speed V may be employed in place of the second-motor rotation speed $N_{M2}$. If the vehicle speed V lies at a high speed exceeding a given vehicle speed determining value, the C0-lock control is executed. Thus, the limited differential action of the power distributing mechanism 16 easily controls the second electric motor M2 to rotate at the rotation speed below the permit rotation speed $N_{PM2}$, and causes the rotational resistance resulting from the engine 8 to act in the direction to prevent the increase in the second-motor rotation speed $N_{M2}$. In such a way, the second electric motor M2 can be prevented from rotating at the high speed.

Under a circumstance where the vehicle speed V is employed in place of the second-motor rotation speed $N_{M2}$, the vehicle speed determining value, representing a threshold value for determining whether or not the vehicle speed V lies at the high speed, may be a factor of the speed ratio of the automatic shifting portion 20. Under a circumstance where the second electric motor M2 can be easily controlled to rotate at a speed below the permit rotation speed $N_{PM2}$ even in the absence of the C0-lock control being executed, the C0-lock control is not executed, but may be executed when needed. In such a way, the second electric motor M2 can be prevented from rotating at the high speed.

(5) In determining operation of the differential-action limiting second-condition determining means 84, engine torque $T_E$ may be employed in place of the throttle valve opening $\theta_{TH}$. Under a circumstance where engine torque $T_E$ lies at high torque exceeding a given engine torque determining value, the C0-lock control is executed. Thus, the limited differential action of the power distributing mechanism 16 easily controls the second electric motor M2 to rotate at the rotation speed below the permit rotation speed $N_{PM2}$, and causes the rotational resistance resulting from the engine 8 to act in the direction to prevent the increase in the second-motor rotation speed $N_{M2}$. In such a way, the second electric motor M2 can be prevented from rotating at the high speed.

(6) In determining operations of the differential-action limiting first-condition determining means 82 and the differential-action limiting second-condition determining means 84, the second-motor rotation speed $N_{M2}$ may be replaced by the rotation speed of the power transmitting member 18 acting as the input shaft of the automatic shifting portion 20. If the rotation speed of the power transmitting member 18 lies at a high speed exceeding a given input-shaft rotation speed determining value, the C0-lock control is executed. Thus, the limited differential action of the power distributing mechanism 16 easily controls the second electric motor M2 to rotate at the rotation speed below the permit rotation speed $N_{PM2}$, and causes the rotational resistance resulting from the engine 8 to act in the direction to prevent the increase in the second-motor rotation speed $N_{M2}$. In such a way, the second electric motor M2 can be prevented from rotating at the high speed.

(7) In determining operations of the differential-action limiting first-condition determining means 82 and the differential-action limiting second-condition determining means 84, the second-motor rotation speed $N_{M2}$ may be replaced by the rotation speed of the clutch or the brake forming the clutch engaging elements of the automatic shifting portion 20. Using the rotation speed of the clutch or the brake such as the first clutch C1 and the second clutch C2 allows the C0-lock control to be executed when the rotation speed of the clutch or the brake reaches a high-speed rotation state exceeding a given engaging-element rotation speed determining value. Thus, the limited differential action of the power distributing mechanism 16 easily controls the second electric motor M2 to rotate at the rotation speed below the permit rotation speed $N_{PM2}$, and causes the rotational resistance resulting from the engine 8 to act in the direction to prevent the increase in the second-motor rotation speed $N_{M2}$. In such a way, the second electric motor M2 can be prevented from rotating at the high speed.

Figure 12:
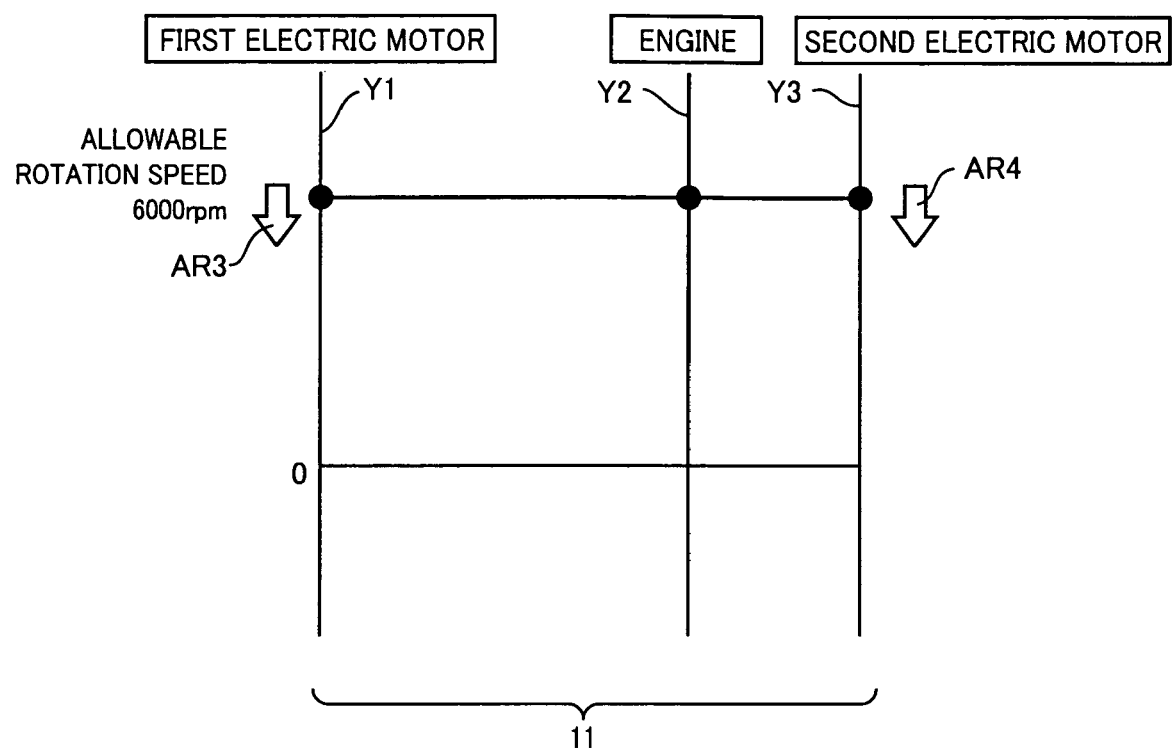
FIG. 12 is a collinear chart, showing the relationships among relative rotation speeds of the engine and the first and second electric motors with the switching clutch held in an engaged state, which illustrates characteristic portions extracted from the collinear chart shown in FIG. 3 and corresponding to those of the differential portion shown therein.

FIG. 12 is a collinear chart showing the relationship among the relative rotation speeds of the engine 8, the first electric motor M1 and the second electric motor M2 with the switching clutch C0 held in engagement. In FIG. 12, portions corresponding to the differential portion 11 are extracted of FIG. 3, the vertical lines Y1 to Y3 of FIG. 12 being identical to each other.

With the present embodiment, if the C0-lock control is executed with the power transmitting path of the automatic shifting portion 20 being interrupted, the differential portion 11 is placed in the non-differential or nearly non-differential state with the unitary rotations of the rotary elements RE1, RE2 and RE3 as shown in FIG. 12. Thus, the engine 8, the first electric motor M1 and the second electric motor M2 rotate at the same or nearly identical rotation speeds.

Then, in order to control the second electric motor M2 at a rotation speed below the permit rotation speed $N_{PM2}$, it may suffice for the first electric motor M1 to be driven in a direction to lower the rotation speed $N_{M1}$ as indicated by an arrow AR4 in FIG. 12 while monitoring the engine rotation speed $N_E$, the first-motor rotation speed $N_{M1}$ and the second-motor rotation speed $N_{M2}$. Thus, the second electric motor M2 is sufficiently driven in a direction to lower the rotation speed $N_{M2}$ as indicated by the arrow AR4 in FIG. 12, resulting in performance of easier control. Further, the rotational resistance, resulting from the engine 8, acts in the direction to prevent the increase in the second-motor rotation speed $N_{M2}$. In such a way, the second electric motor M2 can be prevented from rotating at the high speed.

(9) The differential portion 11 is rendered operative to act as the continuously variable transmission with the operation executed to control the operating state of the first electric motor M1 to which the differential-portion sun gear S0 is connected. Therefore, the differential portion 11 and the automatic shifting portion 20 constitute the continuously variable transmission, thereby varying the drive torque continuously. Further, continuously varying the speed ratio renders the differential portion 11 operative to act as the electrically controlled continuously variable transmission. In addition, controlling the operating state of the first electric motor M1 can vary the speed ratio 11 of the differential portion 11 step-by-step, thereby rendering the differential portion operative to act as the step-variable transmission.

(10) Under a situation where the power transmitting path of the automatic shifting portion 20 is interrupted during the running of the vehicle, the determination is made whether to execute the C0-lock control for limiting the differential action of the differential portion 11 (power distributing mechanism 16) based on the throttle valve opening $\theta_{TH}$ and the second-motor rotation speed $N_{M2}$ that can obtain engine torque $T_E$ in SA2 and SA4 in FIG. 11. Therefore, in a case where the second electric motor M2 can be easily controlled to lower the rotation speed below the second permit rotation speed $N_{PM2}$ even upon absence of the C0-lock control. Thus, the C0-lock control is not executed but executed when needed. In such a way, the second electric motor M2 can be prevented from rotating at the high speed.

(11) Under a circumstance where the power transmitting path of the automatic shifting portion 11 is interrupted, when determining in SA 2 that the second-motor rotation speed $N_{M2}$ reaches a high-speed rotation speed exceeding the first rotation-speed determining value $N_{LMT1}$, the C0-lock control is executed. In an alternative, the operations in SA 3 and SA 4 are executed to make positive determinations on both of two conditions including (a) the rotation speed $N_{M2}$ reaching a high-speed rotation exceeding the second permit rotation speed $N_{PM2}$; and (b) the throttle valve opening $\theta_{TH}$ exceeding the throttle valve opening determining value $\theta_{LMT}$. Under such two conditions satisfied, the C0-lock control is executed. Thus, in a case where the second electric motor M2 can be easily controlled to lower the rotation speed below the second permit rotation speed $N_{PM2}$ even if no C0-lock control is executed, the C0-lock is not executed. It is executed when needed, so that the second electric motor M2 can be prevented from rotating at the high speed.

(12) The present embodiment has no intension to uniformly lower the rotation speeds of the engine 8 and the second electric motor M2. With the C0-lock control executed, the differential portion 11 is placed in the non-differential or nearly non-differential state with the rotary elements RE1, RE2 and RE3 being held in a unitary rotation. This allows the second-motor rotation speed $N_{M2}$, i.e., the input rotation speed of the automatic shifting portion 20 to be maintained at a certain level of high-speed rotation in conformity to the vehicle speed V and the speed ratio of the automatic shifting portion 20. This results in a response increase under a circumstance where the shift operating device 48 is subsequently shifted from the "N" position to the drive position such as the "D" position.

(13) With the C0-lock control executed, the differential portion 11 is placed in the non-differential or nearly non-differential state with the rotary elements RE1, RE2 and RE3 being held in the unitary rotation. This allows the second-motor rotation speed $N_{M2}$ to be maintained at the fuel cutoff rotation speed of the engine 8, i.e., a level lowered below the threshold value (of about 6000 rpm) or a level nearly lower than such a value at which the fuel supply is interrupted or minimized. In such a way, the second electric motor M2 can be prevented from rotating at the high speed.

(14) Thus, the second electric motor M2 is prevented from reaching the high speed rotation, thereby preventing the high speed rotations of the first and second clutches C1 and C2 connected to the second electric motor M2. Further, the second electric motor M2 is connected to the differential-portion ring gear R0, and the rotation speeds of the differential-portion planetary gears P0 are proportionate to the rotation speed of the differential-portion ring gear R0 relative to the differential-portion carrier CA0. Therefore, executing the C0-lock control to place the differential portion 11 in the non-differential or nearly non-differential state with the rotary elements RE1, RE2 and RE3 brought into the unitary rotation also prevents the differential-portion planetary gears P0 from rotating at a high speed.

Next, another embodiment according to the present invention will be described below. In the following description, the component parts common to the various embodiments bear like reference numerals to omit redundant description.

Embodiment 2

Figure 13:
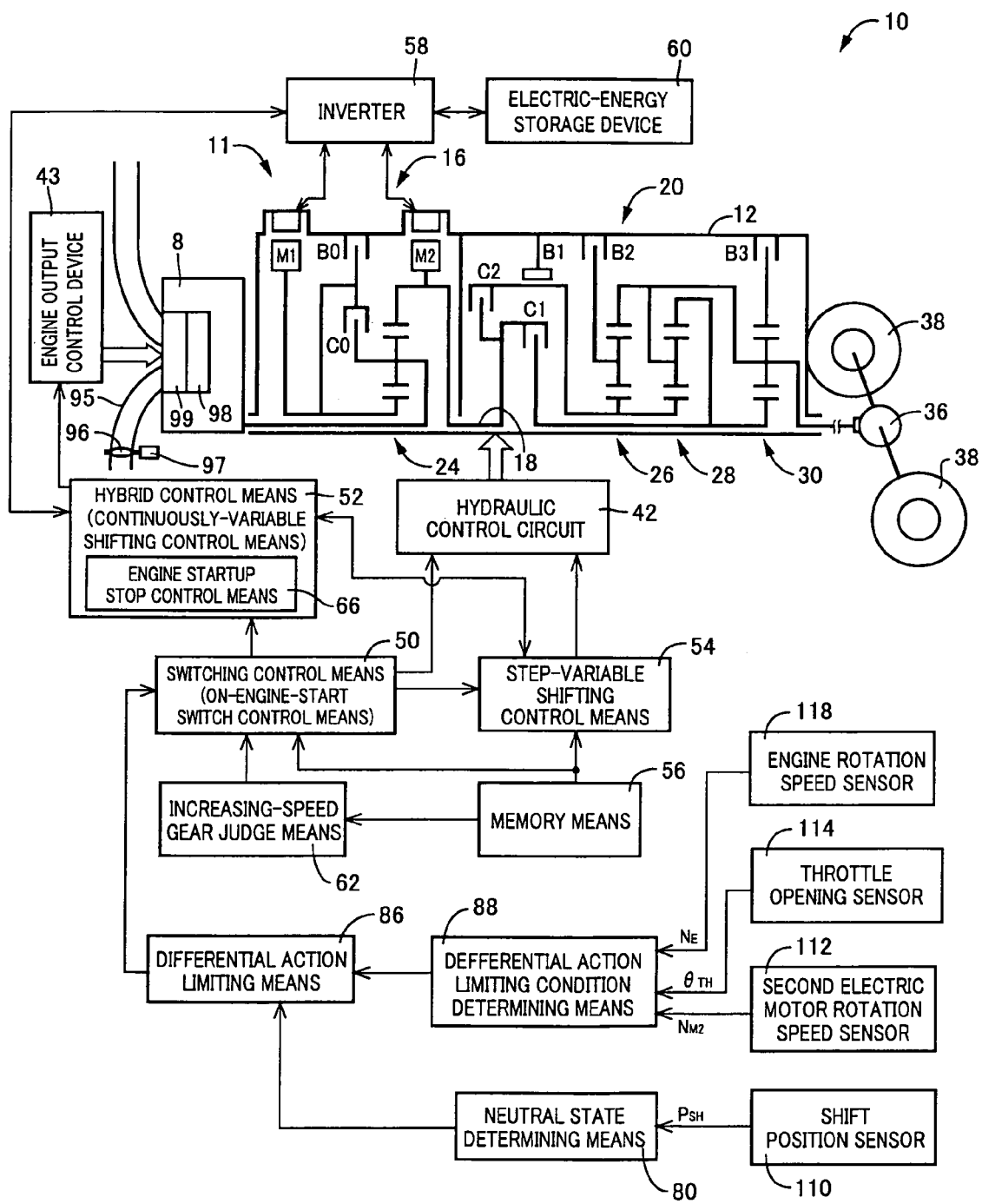
FIG. 13 is a functional block diagram, illustrating a major control function to be executed by the electronic control device, shown in FIG. 4 and related to a second embodiment, which corresponds to FIG. 6.

A second embodiment is a modified form of the first embodiment in which the electronic control device 40, shown in FIG. 4, is replaced by an electronic control device 116 (see FIG. 4). FIG. 13, representing a functional block diagram for illustrating a major portion of a control function to be executed with the electronic control device 116 of the second embodiment, shows another embodiment in a structure corresponding to that shown in FIG. 6. The first and second embodiments commonly include the neutral state determining means 80 and the differential action limiting means 86. The differential-action limiting first-condition determining means 82 and the differential-action limiting second-condition determining means 84, shown in FIG. 6, are replaced by differential-action limiting condition determining means 88 that will be described later. Hereunder, description will be made with a focus mainly on points different from the first embodiment.

Figure 14:
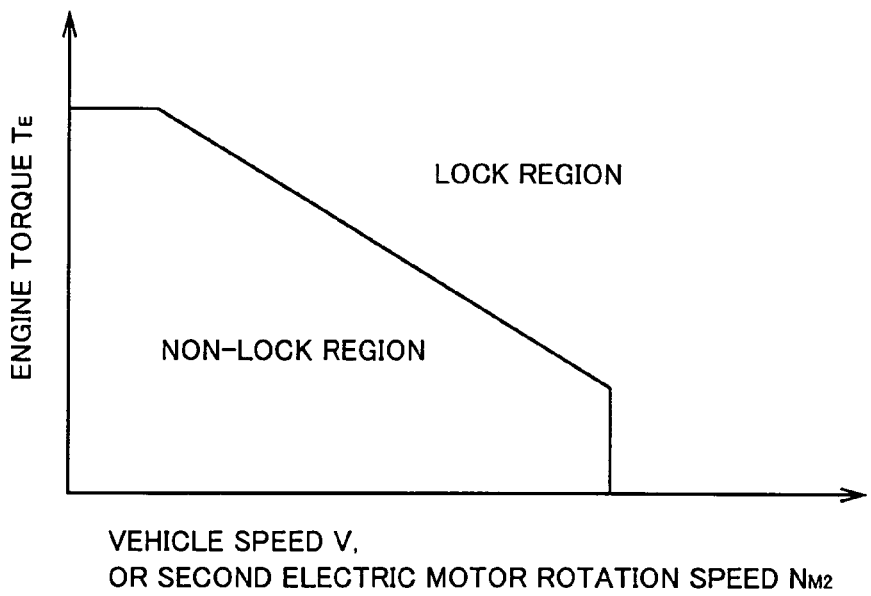
FIG. 14 is a view, showing one example of an operating mode for determining whether to execute a C0-lock control, which is plotted on a two-dimensional coordinate system in terms of parameters including a vehicle speed V or a second-motor rotation speed $N_{M2}$ and engine torque $T_E$.

FIG. 14 is a view, showing one example of an operation to determine whether to execute the C0-lock control, in which a two-dimensional coordinate is plotted in terms of the vehicle speed or the second-motor rotation speed $N_{M2}$ and engine torque $T_E$. The operation is demarcated in two regions, i.e., a non-lock region, in which no C0-lock control is executed under a circumstance where engine torque $T_E$ is low and the vehicle speed or the second-motor rotation speed $N_{M2}$ is low, and a lock region in which the C0-lock control is executed under a circumstance where engine torque $T_E$ is high and the vehicle speed or the second-motor rotation speed $N_{M2}$ is high.

The differential-action limiting condition determining means 88 stores therein the relationship between an electronic throttle valve opening $\theta_{TH}$ detected with the throttle opening sensor 114, and the engine rotation speed $N_E$ detected with an engine rotation speed sensor 118, and engine torque $T_E$. Upon receipt of the electronic throttle valve opening $\theta_{TH}$ and engine torque $T_E$ in storage, the differential-action limiting condition determining means 88 determines which of the lock region or the non-lock region, shown in FIG. 14, belongs to the coordinate obtained based on the relationship between the vehicle speed or the second-motor rotation speed $N_{M2}$ and engine torque $T_E$.

Under a circumstance where the neutral state determining means 80 makes a positive determination, when the differential-action limiting condition determining means 88 determines that the coordinate belongs to the lock region, then, the differential action limiting means 86 allows the switching control means 50 to execute the C0-lock control. In contrast, when the differential-action limiting condition determining means 88 determines that the coordinate belong to the non-lock region, then, the differential action limiting means 86 allows the switching control means 50 to execute a C0-disengagement control.

In addition, because of the same reasons as those of the first embodiment, in place of the second-motor rotation speed $N_{M2}$, the rotation speed of the power transmitting member 18 may be employed; and the rotation speed of the clutch or the brake, such as the first and second clutches C1 and C2 incorporated in the automatic shifting portion 20, may be employed. In an alternative, in a case where the vehicle speed V is adopted on a horizontal line in FIG. 14, a boundary between the lock region and the non-lock region may be altered depending on the speed ratio of the automatic shifting portion 20.

Figure 15:
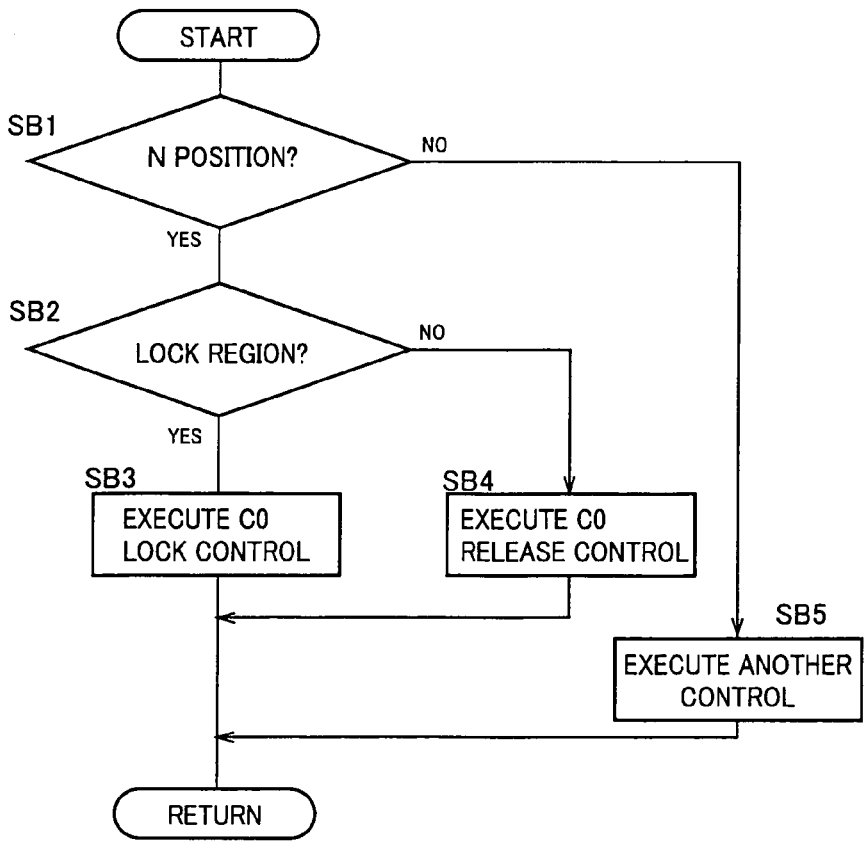
FIG. 15 is a flowchart illustrating a basic sequence of major control operations, i.e., control operations to be executed with the electronic control device shown in FIG. 4 related to the second embodiment for switching a power transmitting path of an automatic shifting portion from a power transmitting state to a power cutoff i.e. interrupted state during the running of a vehicle.

FIG. 15 is a flowchart for illustrating a major control operation of the electronic control device 114. That is, FIG. 15 illustrates the control operation to be executed when the power transmitting path of the automatic shifting portion is switched from the power transmitting state to the power cut-off state during the running of the vehicle. This sequence is repeatedly executed for an extremely short cycle time in the order of, for instance, several milliseconds or several tens milliseconds. FIG. 15 shows the flowchart of the present embodiment corresponding to that shown in FIG. 11. SB1, SB3 to SB5, shown in FIG. 15, represents steps corresponding to SA1, SA3 to SA7 in FIG. 11. Hereunder, description will be made with a focus mainly on points different from the steps shown in FIG. 11.

If a positive determination is made in SB1, then, in SB 2 corresponding to the differential-action limiting condition determining means 88, engine torque $T_E$ is obtained based on the electronic throttle valve opening $\theta_{TH}$ and the engine rotation speed $N_E$ by referring to a given relationship preliminarily obtained on an experimental basis. As used herein, the term "given relationship" refers to the relationship between the electronic throttle valve opening $\theta_{TH}$ detected with the throttle opening sensor 114, and the engine rotation speed $N_E$ detected with the engine rotation speed sensor 118, and engine torque $T_E$.

For the lock region and the non-lock region demarcated in FIG. 14, the operation is executed to determine which of the lock region and the non-lock region, shown in FIG. 14, belongs to the coordinate obtained based on the relationship between the vehicle speed V or the second-motor rotation speed $N_{M2}$ and engine torque $T_E$. If the determination is made that the coordinate belongs to the lock region, then, the operation goes to SB3. If the determination is made that the coordinate belongs to the non-lock region, then, the operation goes to SB4.

With the second embodiment, the operation is executed to determine whether to execute the C0-lock control based on FIG. 14 in which a coordinate plane is demarcated in the lock region and the non-lock region in terms of the vehicle speed V or the second-motor rotation speed $N_{M2}$ and engine torque $T_E$ plotted on the coordinate axes. This enables the operation to be executed to determine whether to execute the C0-lock control in a further appropriate fashion than that achieved in determining whether to execute the C0-lock control individually based on the vehicle speed V or the second-motor rotation speed $N_{M2}$ and engine torque $T_E$. In addition, the electronic control device 116 of the second embodiment is configured to execute the operation based on an altered determining standard, shown in FIG. 14, for determining whether to execute the C0-lock control to be different from the operation to be executed in the electronic control device 40 of the first embodiment set forth above. Thus, the second embodiment also has the same advantageous effects as those (1) to (10) and (12) to (14) of the first embodiment.

In the foregoing, while the present invention ahs been described above with reference to the various embodiments, the embodiments described are meant to be illustrative only of mere examples of the present invention. The present invention can be implemented in various modifications or improvements in the light of knowledge of those skilled in the art.

For instance, the differential portion 11 has been described above as having the function to operate as the electrically controlled continuously variable transmission with the speed ratio γ0 enabled to continuously vary in the value ranging from the minimum value γ0min to the maximum value γ0max. It may suffice for, for instance, the speed ratio γ0 of the differential portion 11 not to be continuously stepwise but to be stepwise varied upon daringly utilizing the differential action.

While the shifting mechanism 10 has been described above with reference to the structure in which the engine 8 and the differential portion are directly connected to each other, it may suffice for the engine 8 to be connected to the differential portion 11 via a clutch engaging element such as a clutch.

When executing the C0-lock control, the operation may be executed so as to lower engine torque $T_E$ in synchronous with such a control. With such an operation, executing the C0-lock control allows the engine 8 (RE1) and the second electric motor M2 (RE3) to rotate at identical or nearly identical speeds, thereby preventing the second electric motor M2 from rotating at a high speed.

The automatic shifting portion 20 can function as the automatic transmission. However, under a circumstance where the automatic shifting portion 20 serves as the power connecting/disconnecting means, no speed ratio is varied in the automatic shifting portion 20. Accordingly, no need arises for the automatic shifting portion 20 to have a function as the transmission.

Although the automatic shifting portion 20 is connected to the power transmitting path extending from the engine 8 to the drive wheels 38 at a position next to the differential portion 11, the differential portion 11 may be connected in sequence to the output of the automatic shifting portion 20.

The differential portion 11 and the automatic shifting portion 20 are connected to each other in series in the structure shown FIG. 1. However, the present invention can be applied to a structure even if the differential portion 11 and the automatic shifting portion 20 are mechanically independent from each other, provided that a whole of the shifting mechanism 10 has a function to achieve an electrically controlled differential action enabling a differential state to be electrically varied, and a function to perform a shifting on a principle different from the function of the electrically controlled differential action. While the power distributing mechanism 16, having been described above as of the single planetary type, may be of a doubled-planetary type.

The various embodiments have been described above with reference to the structure wherein the engine 8 is connected to the first rotary element RE1 of the differential-portion planetary gear unit 24 for drive-force transmitting capability, the first electric motor M2 is connected to the second rotary element RE2 for drive-force transmitting capability, and the power transmitting path for the drive wheels 38 is connected to the third rotary element RE3. However, the present invention may be applied to such a structure including, for instance, two planetary gear units wherein partial rotary elements, forming such planetary gear units, are connected to each other. With such a structure, an engine, an electric motor and drive wheels are connected to the rotary elements of the planetary gear units for drive-force transmitting capability such that a clutch or a brake, connected to the rotary elements of the planetary gear units, can be controlled to switch a shifting mode between a step-variable shifting mode and a continuously variable shifting mode.

The second electric motor M2, having been described above with reference to the structure directly connected to the power transmitting member 18, may be indirectly connected to the power transmitting member 18 via a transmission or the like. In an alternative, further, the second electric motor M2 may be connected to the power transmitting member 18 via a clutch engaging device such as a clutch or the like for power-connecting or power-disconnecting capability.

While the automatic shifting portion 20, having been described above as having a function to serve as the step-variable automatic transmission, may include a continuously variable CVT or a shifting portion that functions as a manually operated transmission.

The first and second embodiments may be implemented in a mutually combined form upon providing, for instance, a priority order.

What is claimed is:

1. A control device for a hybrid vehicle drive apparatus in which the hybrid vehicle drive apparatus comprises an electrically controlled differential portion including a differential mechanism, connected to an engine in a drive-force transmissive state, whose differential state is controlled with controlling an operating state of a first electric motor, a second electric motor connected such that power can be transmitted between drive wheels and the second electric motor, and a shifting portion or an engaging element forming a part of the power transmitting path;

the control device for the hybrid vehicle drive apparatus, comprising:

the differential mechanism including a differential action limiting device for limiting a differential action thereof; and the control device being operative to cause the differential action limiting device to limit the differential action of the differential mechanism, when the shifting portion is placed in a neutral state with the power transmitting path being interrupted.

2. The control device for the hybrid vehicle drive apparatus according to claim 1, wherein the control device causes the differential action limiting device to limit the differential action of the differential mechanism, when a vehicle speed lies at a high vehicle speed exceeding a given vehicle speed determining value.

3. The control device for the hybrid vehicle drive apparatus according to claim 2, wherein the given vehicle speed determining value is a function of a speed ratio of the shifting portion.

4. The control device for the hybrid vehicle drive apparatus according to claim 1, wherein the control device causes the differential action limiting device to limit the differential action of the differential mechanism, when an output torque delivered from the engine lies at a high torque exceeding a given engine torque determining value.

5. The control device for the hybrid vehicle drive apparatus according to claim 1, wherein the control device causes the differential action limiting device to limit the differential action of the differential mechanism, when a rotation speed of the second electric motor lies at a high rotation speed exceeding a given second-motor rotation speed determining value.

6. The control device for the hybrid vehicle drive apparatus according to claim 1, wherein the control device causes the differential action limiting device to limit the differential action of the differential mechanism, when a rotation speed of an input shaft of the shifting portion lies at a high rotation speed exceeding a given input-shaft rotation speed determining value.

7. The control device for the hybrid vehicle drive apparatus according to claim 1, wherein the control device causes the differential action limiting device to limit the differential action of the differential mechanism, when a rotation speed of an engaging element incorporated in the shifting portion lies at a high rotation speed exceeding a given engaging-element rotation speed determining value.

8. The control device for the hybrid vehicle drive apparatus according to claim 1, wherein the differential mechanism includes a first rotary element connected to the engine in the drive-force transmissive state, a second rotary element connected to the first electric motor in the drive-force transmissive state, and a third rotary element connected to the drive wheels in the drive-force transmissive state; and the differential action limiting device suppresses a relative rotation of at least two rotary elements among the first rotary element to third rotary element for limiting the differential action of the differential mechanism.

9. The control device for the hybrid vehicle drive apparatus according to claim 1, wherein the electrically controlled differential portion operates as a continuously variable transmission with controlling the operating state of the first electric motor.

10. The control device for the hybrid vehicle drive apparatus according claim 1, wherein when the shifting portion is in the neutral state during the vehicle running, the determination whether to cause the differential action limiting device to limit the differential action of the differential mechanism is executed based on output torque of the engine and the rotation speed of the second electric motor.

11. The control device for the hybrid vehicle drive apparatus according to claim 1, wherein in the neutral state of the shifting portion during the vehicle running, the differential action limiting device operates to limit the differential action when the rotation speed of the second electric motor exceeds a given first-motor rotation speed determining value for determining whether to cause the differential action limiting device to limit the differential action.

12. The control device for the hybrid vehicle drive apparatus according to claim 11, wherein in the neutral state of the shifting portion during the vehicle running, the differential action limiting device operates to limit the differential action when the rotation speed of the second electric motor exceeds a given second-motor rotation speed determining value lower than the given first-motor rotation speed determining value, and output torque of the engine exceeds the given engine torque determining value.

13. A control device for a hybrid vehicle drive apparatus in which the hybrid vehicle drive apparatus comprises an electrically controlled differential portion including a differential mechanism, connected to an engine in a drive-force transmissive state, whose differential state is controlled with controlling an operating state of a first electric motor, a second electric motor connected such that power can be transmitted between drive wheels and the second electric motor, and drive-force connecting/disconnecting means operative to connect and disconnect a power transmitting path;

the control device for the hybrid vehicle drive apparatus comprising:

the differential mechanism including a differential action limiting device for limiting a differential action of the differential mechanism; and the control device is operative to cause the differential action limiting device to limit the differential action of the differential mechanism, when the drive-force connecting/disconnecting means disconnects the power transmitting path.

14. The control device for the hybrid vehicle drive apparatus according to claim 13, wherein the differential mechanism includes a first rotary element connected to the engine in the drive-force transmissive state, a second rotary element connected to the first electric motor in the drive-force transmissive state, and a third rotary element connected to the drive wheels in the drive force transmissive state; and the differential action limiting device suppresses a relative rotation of at least two rotary elements among the first rotary element to third rotary element for limiting the differential action of the differential mechanism.

15. The control device for the hybrid vehicle drive apparatus according to claim 13, wherein the electrically controlled differential portion operates as a continuously variable transmission with controlling the operating state of the first electric motor.

16. The control device for the hybrid vehicle drive apparatus according claim 13, wherein when the shifting portion is in the neutral state during the vehicle running, the determination whether to cause the differential action limiting device to limit the differential action of the differential mechanism is executed based on output torque of the engine and the rotation speed of the second electric motor.

17. The control device for the hybrid vehicle drive apparatus according to claim 13, wherein in the neutral state of the shifting portion during the vehicle running, the differential action limiting device operates to limit the differential action when the rotation speed of the second electric motor exceeds a given first-motor rotation speed determining value for determining whether to cause the differential action limiting device to limit the differential action.

18. The control device for the hybrid vehicle drive apparatus according to claim 17, wherein in the neutral state of the shifting portion during the vehicle running, the differential action limiting device operates to limit the differential action when the rotation speed of the second electric motor exceeds a given second-motor rotation speed determining value lower than the given first-motor rotation speed determining value, and output torque of the engine exceeds the given engine torque determining value.

* * * * *